United States Patent
Zhao et al.

(10) Patent No.: US 11,523,112 B2
(45) Date of Patent: Dec. 6, 2022

(54) INTRA CODING WITH L-TYPE PARTITIONING TREE

(71) Applicant: TENCENT AMERICA LLC, Palo Alto, CA (US)

(72) Inventors: Xin Zhao, San Diego, CA (US); Liang Zhao, Sunnyvale, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/993,491

(22) Filed: Aug. 14, 2020

(65) Prior Publication Data

US 2021/0321097 A1    Oct. 14, 2021

Related U.S. Application Data

(60) Provisional application No. 63/007,852, filed on Apr. 9, 2020.

(51) Int. Cl.
| | | |
|---|---|---|
| *H04N 19/119* | (2014.01) | |
| *H04N 19/105* | (2014.01) | |
| *H04N 19/132* | (2014.01) | |
| *H04N 19/176* | (2014.01) | |
| *H04N 19/159* | (2014.01) | |

(52) U.S. Cl.
CPC ......... *H04N 19/119* (2014.11); *H04N 19/105* (2014.11); *H04N 19/132* (2014.11); *H04N 19/159* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 9,363,511 B2 | 6/2016 | Zhang et al. | |
| 9,769,472 B2 | 9/2017 | Liu et al. | |
| 10,582,195 B2 | 3/2020 | Liu et al. | |
| 11,153,569 B2* | 10/2021 | Liao | H04N 19/513 |
| 2014/0233655 A1* | 8/2014 | Jung | H04N 19/44 |
| | | | 375/240.16 |
| 2014/0348237 A1* | 11/2014 | Thiesse | H04N 19/147 |
| | | | 375/240.26 |
| 2017/0244964 A1* | 8/2017 | Liu | H04N 19/119 |

(Continued)

FOREIGN PATENT DOCUMENTS

| | | |
|---|---|---|
| CN | 106375764 B | 4/2018 |

OTHER PUBLICATIONS

Peter De Rivaz et al., "AV1 Bitstream & Decoding Process Specification", The Alliance for Open Media, 2018, 681 pgs.

(Continued)

*Primary Examiner* — Talha M Nawaz
(74) *Attorney, Agent, or Firm* — Sughrue Mion, PLLC

(57) ABSTRACT

There is includes a method and apparatus comprising computer code configured to cause a hardware processor or processors to perform obtaining a block of video data, splitting the block into an L-shaped partition and a second partition, the second partition being one of a rectangular shaped partition and another L-shaped partition, and performing intra prediction of the L-shaped partition by using a reference sample chain, comprising a chain of neighboring reconstructed samples, as reference samples.

20 Claims, 26 Drawing Sheets

(56) References Cited

U.S. PATENT DOCUMENTS

| | | | |
|---|---|---|---|
| 2017/0353730 A1* | 12/2017 | Liu | H04N 19/159 |
| 2018/0054622 A1 | 2/2018 | Bossen | |
| 2018/0324418 A1* | 11/2018 | Koo | H04N 19/147 |
| 2019/0028736 A1 | 1/2019 | Karczewicz et al. | |
| 2019/0379914 A1* | 12/2019 | Misra | H04N 19/186 |
| 2020/0084452 A1* | 3/2020 | Liao | H04N 19/137 |
| 2020/0099925 A1 | 3/2020 | Lee | |
| 2020/0112735 A1* | 4/2020 | Xu | H04N 19/132 |
| 2020/0404312 A1* | 12/2020 | Kuo | H04N 19/124 |

OTHER PUBLICATIONS

Yue Chen et al., "An Overview of Core Coding Tools in the AV1 Video Codec", IEEE, 2018, pp. 41-45.

Rajan Joshi et al., "High Efficiency Video Coding (HEVC) Screen Content Coding: Draft 4", Joint Collaborative Team on Video Coding (JCT-VC) of ITU-T SG 16 WP 3 and ISO/IEC JTC 1/SC 29/WG 11, ISO/IEC 23008-2:015(E), Document JCTVC-U1005_r1, Jun. 19-26, 2015, 663 pgs., 21st Meeting, Warsaw, PL.

Benjamin Bross et al., "Versatile Video Coding (Draft 8)", Joint Video Experts Team (JVET) of ITU-T SG 16 WP 3 and ISO/IEC JTC 1/SC 29/WG 11, Document: JVET-Q2001-vE, Jan. 7-17, 2020, 513 pgs., 17th Meeting: Brussels, BE.

Benjamin Bross et al., "General Video Coding Technology in Responses to the Joint Call for Proposals on Video Compression with Capability beyond Hevc", IEEE Transactions on Circuits and Systems for Video Technology, 2019, pp. 1-16.

International Search Report dated February 2, 2021 from the International Searching Authority in International Application No. PCT/US20/59705.

Written Opinion dated Feb. 2, 2021 from the International Bureau in International Application No. PCT/US20/59705.

Extended European Search Report dated Aug. 2, 2022, issued in European Application No. 20930506.9.

G. Laroche et al., "Intra Prediction with 1D Macroblock Partitioning for Image and Video Coding", Visual Communications and Image Processing, SPIE vol. 7257, Jan. 2009, p. 72570S-1 to 72570S-9, 10 pages.

* cited by examiner

901

900

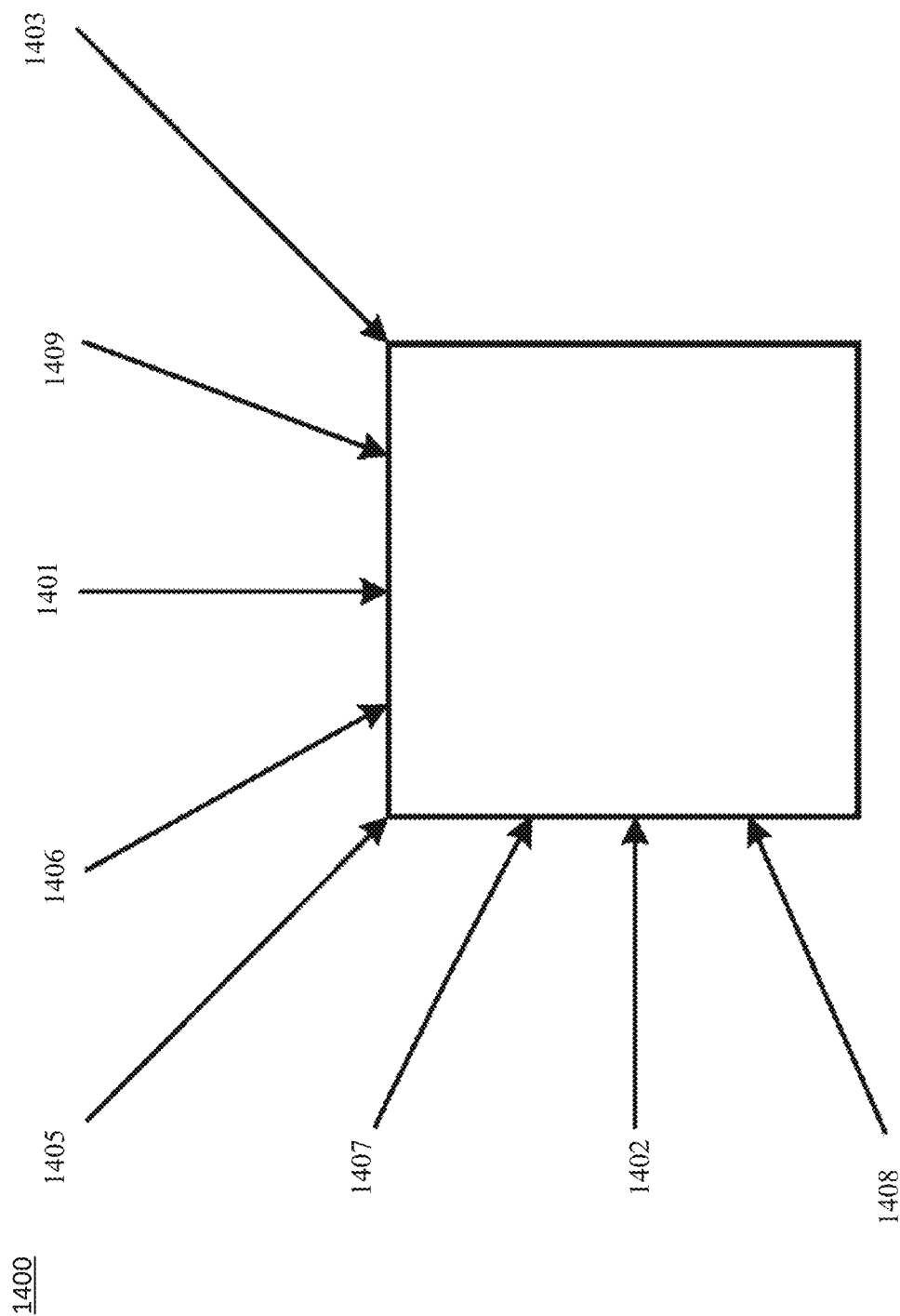

INTRA CODING WITH L-TYPE PARTITIONING TREE

CROSS REFERENCE TO RELATED APPLICATION

The present application claims priority to provisional applications U.S. Ser. No. 63/007,852 filed on Apr. 9, 2020 which is hereby expressly incorporated by reference, in its entirety, into the present application.

BACKGROUND

1. Field

The present disclosure is directed to a set of advanced image and video coding technologies and, according to exemplary embodiments, more specifically to intra coding schemes with one or more L-shaped partitioning trees.

2. Description of Related Art

AOMedia Video 1 (AV1) is an open video coding format designed for video transmissions over the Internet and was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on Sep. 12, 2014, and Cisco's Thor was published on Aug. 11, 2015. Building on the codebase of VP9, AV1 incorporates additional techniques, several of which were developed in these experimental formats. The first version 0.1.0 of the AV1 reference codec was published on Apr. 7, 2016. The Alliance announced the release of the AV1 bitstream specification on Mar. 28, 2018, along with a reference, software-based encoder and decoder. On Jun. 25, 2018, a validated version 1.0.0 of the specification was released, and on Jan. 8, 2019 a validated version 1.0.0 with Errata 1 of the specification was released. The AV1 bitstream specification includes a reference video codec.

FIG. 10A represents a simplified block diagram 1000 of aspects of block partitioning with VP9 which uses a 4-way partition tree starting from the 64×64 level at block 1002 of block 1001 down to a 4×4 level, with some additional restrictions for blocks 8×8 and below at level 1003. Note that partitions designated as R may be referred to as recursive in that a same partition tree may be repeated at a lower scale until reaching a lowest 4×4 level according to exemplary embodiments.

FIG. 10B represents a simplified block diagram 1010 of aspects of block partitioning with AV1 which not only expands such partition-tree to a 10-way structure as shown in FIG. 10B at level 1004, but also increases a largest size (referred to as superblock in VP9/AV1 parlance) to start from 128×128 at block 1021 of block 1020. Note that levels 1004 include 4:1/1:4 rectangular partitions that did not exist in VP9 as described above, and none of the rectangular partitions can be further subdivided according to exemplary embodiments. In addition, AV1 adds more flexibility to the use of partitions below an 8×8 level, as, for example, in a sense that 2×2 chroma inter prediction becomes possible thereby on certain cases.

According to embodiments with HEVC, a coding tree unit (CTU) is split into coding units (CUs) by using a quadtree structure denoted as coding tree to adapt to various local characteristics. The decision on whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure like the coding tree for the CU. One of key features of the HEVC structure is that it has the multiple partition conceptions including CU, PU, and TU. In HEVC, a CU or a TU can only be square shape, while a PU may be square or rectangular shape for an inter predicted block. In HEVC, one coding block may be further split into four square sub-blocks, and transform is performed on each sub-block, i.e., TU. Each TU can be further split recursively (using quadtree split) into smaller TUs, which is called Residual Quad-Tree (RQT).

At picture boundary, HEVC employs implicit quad-tree split so that a block will keep quad-tree splitting until the size fits the picture boundary.

FIG. 11A represents a simplified block diagram 1100 VVC with respect to a Multi-type-tree (MTT) structure 1101 that is included, which is a combination of the illustrated a quadtree (QT) with nested binary trees (BT) and triple-/ternary trees (TT). A CTU or CU is first partitioned recursively by a QT into square shaped blocks. Each QT leaf may then be further partitioned by a BT or TT, where BT and TT splits can be applied recursively and interleaved but no further QT partitioning can be applied. In all relevant proposals, the TT splits a rectangular block vertically or horizontally into three blocks using a 1:2:1 ratio (thus avoiding non-power-of-two widths and heights). For partition emulation prevention, additional split constraints are typically imposed on the MTT, as shown in the simplified diagram 1102 of FIG. 11B, QT-BT-TT block partitioning in VVC, with respect to blocks 1103 (quad), 1104 (binary), JEM), and 1105 (ternary) to avoid duplicated partitions (e.g. prohibiting a vertical/horizontal binary split on the middle partition resulting from a vertical/horizontal ternary split). Further limitations may be set to the maximum depth of the BT and TT.

VP9 supports 8 directional modes corresponding to angles from 45 to 207 degrees. To exploit more varieties of spatial redundancy in directional textures, in AV1, directional intra modes are extended to an angle set with finer granularity. The original 8 angles are slightly changed and made as nominal angles, and these 8 nominal angles are named as V_PRED 1401, H_PRED 1402, D45_PRED 1403, D135_PRED 1404, D113_PRED 1405, D157_PRED 1406, D203_PRED 1407, and D67_PRED 1408, which is illustrated in the simplified diagram 1400 in FIG. 14 with respect to intra prediction modes in AVI and more specifically to direction intra prediction in AVI. For each nominal angle, there may be 7 finer angles according to embodiments, so AV1 has 56 directional angles in total. The prediction angle is presented by a nominal intra angle plus an angle delta, which is −3~3 multiplies the step size of 3 degrees. In AV1, 8 nominal modes together with 5 non-angular smooth modes are firstly signaled, then if current mode is angular mode, an index is further signaled to indicate the angle delta to the corresponding nominal angle. To implement directional prediction modes in AV1 via a generic way, all the 56 directional intra prediction mode in AV1 are implemented with a unified directional predictor that projects each pixel to a reference sub-pixel location and interpolates the reference pixel by a 2-tap bilinear filter.

In AV1, there are 5 non-directional smooth intra prediction modes, which are DC, PAETH, SMOOTH, SMOOTH_V, and SMOOTH_H. For DC prediction, the average of left and above neighboring samples is used as the predictor of the block to be predicted. For PAETH predictor, top, left and top-left reference samples are firstly fetched, and then the value which is closest to (top+left−topleft) is set as the predictor for the pixel to be predicted. With the simplified block diagram 1500 in FIG. 15 with respect to non-directional smooth intra predictors in AVI there is illustrated positions of top, left, and top-left samples for one pixel in a current block. For SMOOTH, SMOOTH_V, and SMOOTH_H modes, there is prediction of the block using quadratic interpolation in vertical or horizontal directions, or by the average both directions.

To capture decaying spatial correlation with references on the edges, FILTER INTRA modes are designed for luma blocks. Five filter intra modes are defined for AV1, each represented by a set of eight 7-tap filters reflecting correlation between pixels in a 4×2 patch and 7 neighbors adjacent to it. In other words, the weighting factors for 7-tap filter are position dependent. Take an 8×8 block for example, it is split into 8 4×2 patches, which is shown with respect to simplified block diagram 1600 of FIG. 16 with respect to recursive-filtering-based intra predictor features. These patches are indicated by B0, B1, B2, B3, B4, B5, B6, and B7 in FIG. 16. For each patch, its 7 neighbors, indicated by R0~R7, are used to predict the pixels in current patch. For patch B0, all the neighbors are already reconstructed. But for other patches, not all the neighbors are reconstructed, then the predicted values of immediate neighbors are used as the reference. For example, all the neighbors of patch B7 are not reconstructed, so the prediction samples of neighbors (i.e., B5 and B6) are used instead according to embodiments.

Chroma from Luma (CfL) is a chroma-only intra predictor that models chroma pixels as a linear function of coincident reconstructed luma pixels. The CfL prediction is expressed as follows:

$$CfL(\alpha)=\alpha \times L^{AG}+DC \qquad (Eq. 1)$$

Wherein $L^{AG}$ denotes the AC contribution of luma component, $\alpha$ denotes the parameter of the linear model, and DC denotes the DC contribution of the chroma component. To be specific, the reconstructed luma pixels are subsampled into the chroma resolution, and then the average value is subtracted to form the AC contribution. To approximate chroma AC component from the AC contribution, instead of requiring the decoder to calculate the scaling parameters as in some prior art, AV1 CfL determines the parameter $\alpha$ based on the original chroma pixels and signals them in the bitstream. This reduces decoder complexity and yields more precise predictions. As for the DC contribution of the chroma component, it is computed using intra DC mode, which is sufficient for most chroma content and has mature fast implementations.

Multi-line intra prediction was proposed to use more reference lines for intra prediction, and encoder decides and signals which reference line is used to generate the intra predictor. The reference line index is signaled before intra prediction modes, and only the most probable modes are allowed in case a nonzero reference line index is signaled. As shown in the simplified diagram 1700 with respect to multiline intra prediction modes shown in FIG. 17, an example of 4 reference lines (reference line 0 (1711), reference line 1 (1712), reference line 2 (1713), and reference line 3 (1714)) is depicted, where each reference line is composed of four segments, i.e., Segment A (1701), Segment B (1702), Segment C (1703), Segment D (1704). In addition, the reconstructed samples in different reference lines are filled with different patterns in FIG. 17 for ease of understanding, and multiline intra prediction mode may be also called Multiple Reference Line Prediction (MRLP) mode.

With L-type partitions, more fully described herein (for example with FIG. 12 among other Figures herein), one or more neighboring reconstructed samples may be also available from any of a right side and/or a bottom side, which may not be fully compatible with intra prediction schemes using top and left reference samples for performing prediction. Further, with L-type partitions, the neighboring reference samples may no longer form a straight line, such that harmonization between Multiple Reference Line Prediction (MRLP) and L-type partitions may need to be addressed to make both MRLP and L-type partition functioning at a same time.

Therefore, there is a desire for a technical solution to such problems.

SUMMARY

There is included a method and apparatus comprising memory configured to store computer program code and a hardware processor or processors configured to access the computer program code and operate as instructed by the computer program code. The computer program selecting code is configured to cause the processor implement computer program code configured to cause the processor to implement obtaining code configured to cause the processor to obtain block of video data, splitting code configured to cause the processor to split the block into an L-shaped partition and a second partition, the second partition being one of a rectangular shaped partition and another L-shaped partition, and performing code configured to cause the processor to perform intra prediction of the L-shaped partition by using a reference sample chain, comprising a chain of neighboring reconstructed samples, as reference samples.

According to exemplary embodiments, the chain comprises both a plurality of horizontal reference lines and a plurality of vertical reference lines from reconstructed samples neighboring the L-shaped partition.

According to exemplary embodiments, a first one of the plurality of vertical reference lines is directly connected to a first one of the plurality of horizontal reference lines, the first one of the plurality of horizontal reference lines is directly connected to a second one of the plurality of vertical reference lines, the second of the plurality of vertical reference lines is directly connected to a second one of the plurality of horizontal reference lines, the first one of the plurality of horizontal references lines and the second one of the plurality of vertical reference lines are within the block, and the first one of the plurality of vertical reference lines and the second one of the plurality of horizontal reference lines are outside of the block.

According to exemplary embodiments, the computer program selecting code is further configured to cause the processor implement the computer program code configured to cause the processor to implement mapping code configured to cause the processor to map at least one sample of at least one of the horizontal reference lines to a left column along the block and to map at least one sample of at least one of the vertical reference lines to a top row along the block.

According to exemplary embodiments, the computer program selecting code is further configured to cause the processor implement the computer program code configured to cause the processor to mapping code configured to cause the processor to map at least one sample of at least one of horizontal reference lines to a top row along the block and to map at least one sample of at least one of the vertical reference lines to the top row along the block.

According to exemplary embodiments, performing the intra prediction comprises projecting a sample of the L-shaped partition to at least one of a vertical side and a horizontal side of the reference sample chain.

According to exemplary embodiments, the computer program selecting code is further configured to cause the processor implement the computer program code configured to cause the processor to implement enabling code configured to cause the processor to enable a bi-directional prediction mode, and generating code configured to, in the bi-direction prediction mode, generate a predictor for a current block of the second partition by utilizing a weighted sum of a first portion and a second portion of the reference sample chain, where the first portion and the second portion of the reference sample chain are non-neighboring to the current block, and where the first portion and the second portion of the reference sample chain are respectively to the right and to the left of the current block.

According to exemplary embodiments, the first portion of the reference sample chain is both to the right and to the top of the current block, and the second portion of the reference sample chain is both to the left and to the bottom of the current block.

According to exemplary embodiments, a first one of the first portion and the second portion of the reference sample chain is within the block, and a second one of the first portion and the second portion of the reference sample chain is outside the block.

According to exemplary embodiments, the L-shaped partition comprises a first side and a second side opposite to the first side, the first side comprises a height greater than the second side, the L-shaped partition further comprises a third side and a fourth side opposite to the third side, and the third side comprises a width that is greater than the fourth side.

BRIEF DESCRIPTION OF THE DRAWINGS

Further features, nature, and various advantages of the disclosed subject matter will be more apparent from the following detailed description and the accompanying drawings in which:

FIG. 14 is a schematic illustration of a diagram in accordance with related art.

Figure 16:
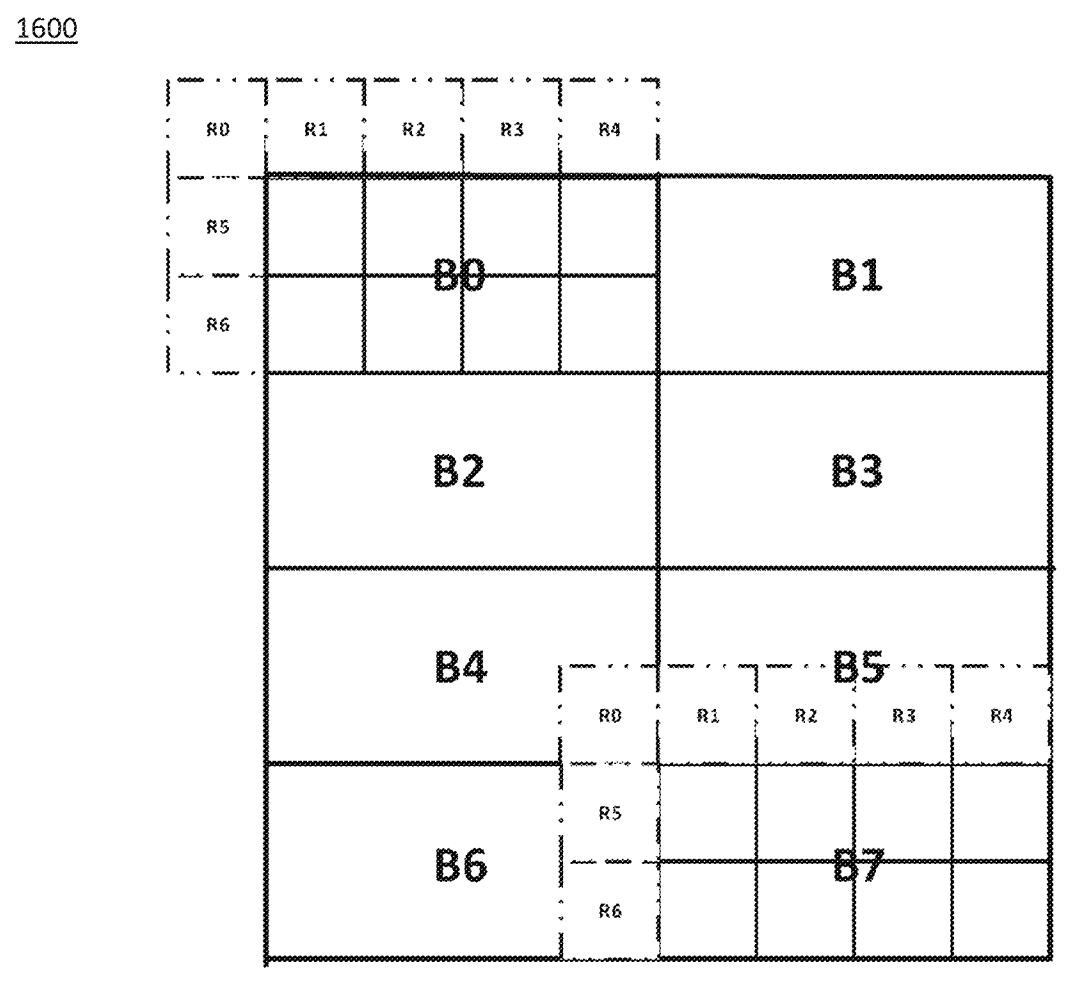

FIG. 16 is a schematic illustration of a diagram in accordance with related art.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
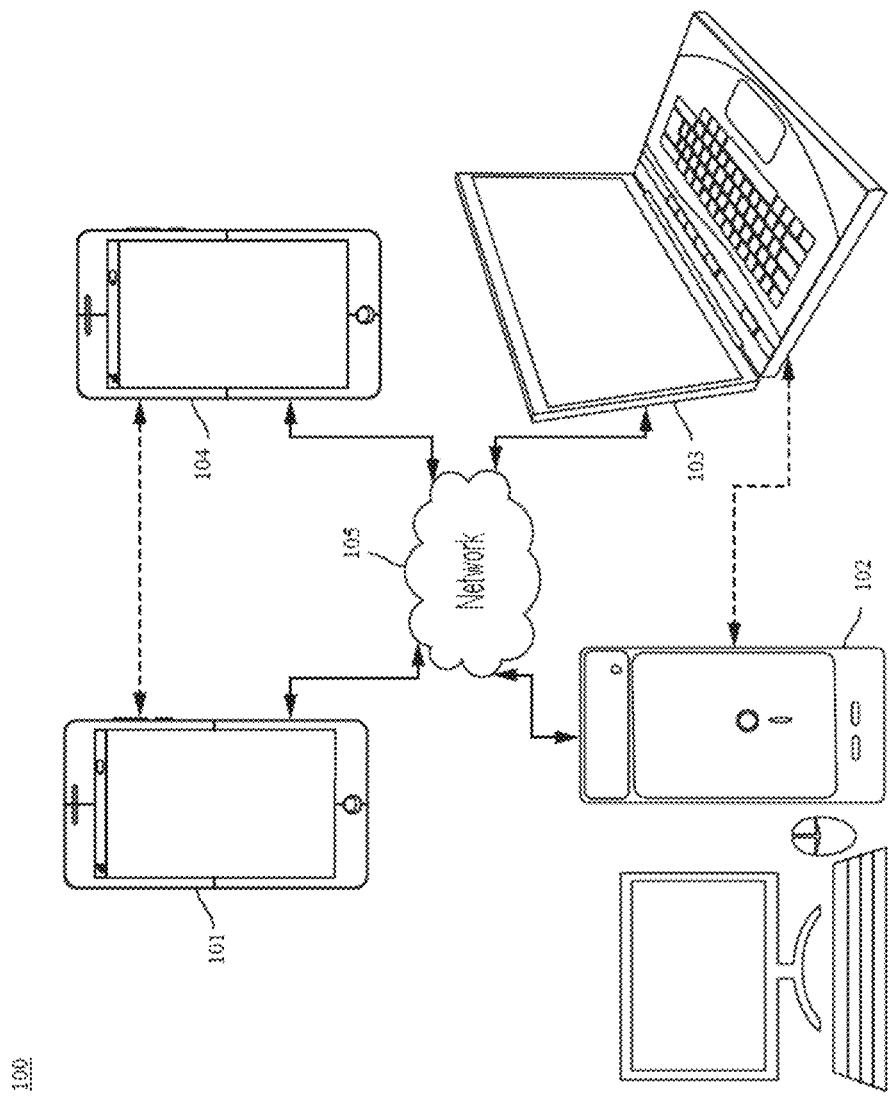
FIG. 1 is a schematic illustration of a diagram in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
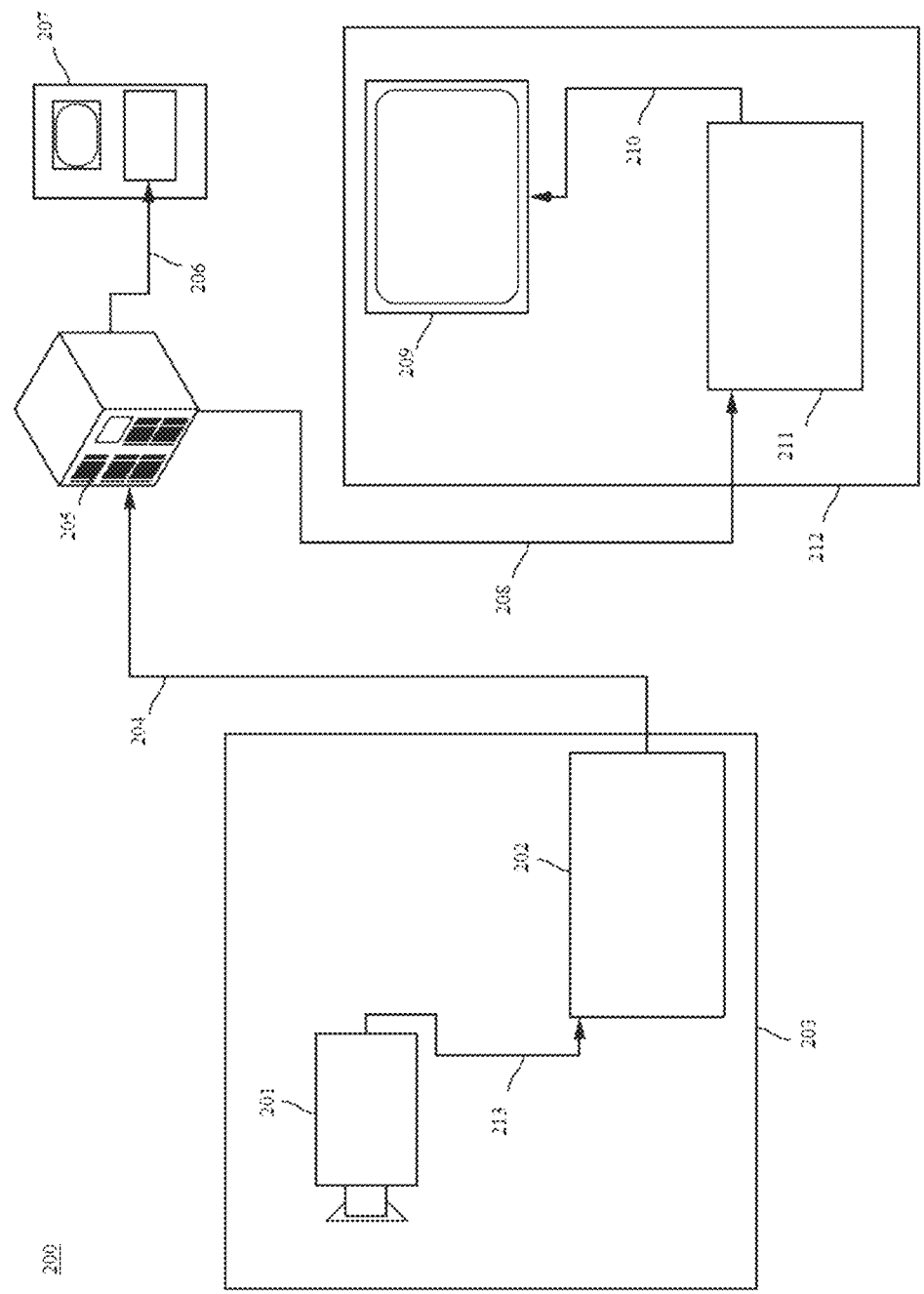
FIG. 2 is a schematic illustration of a diagram in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
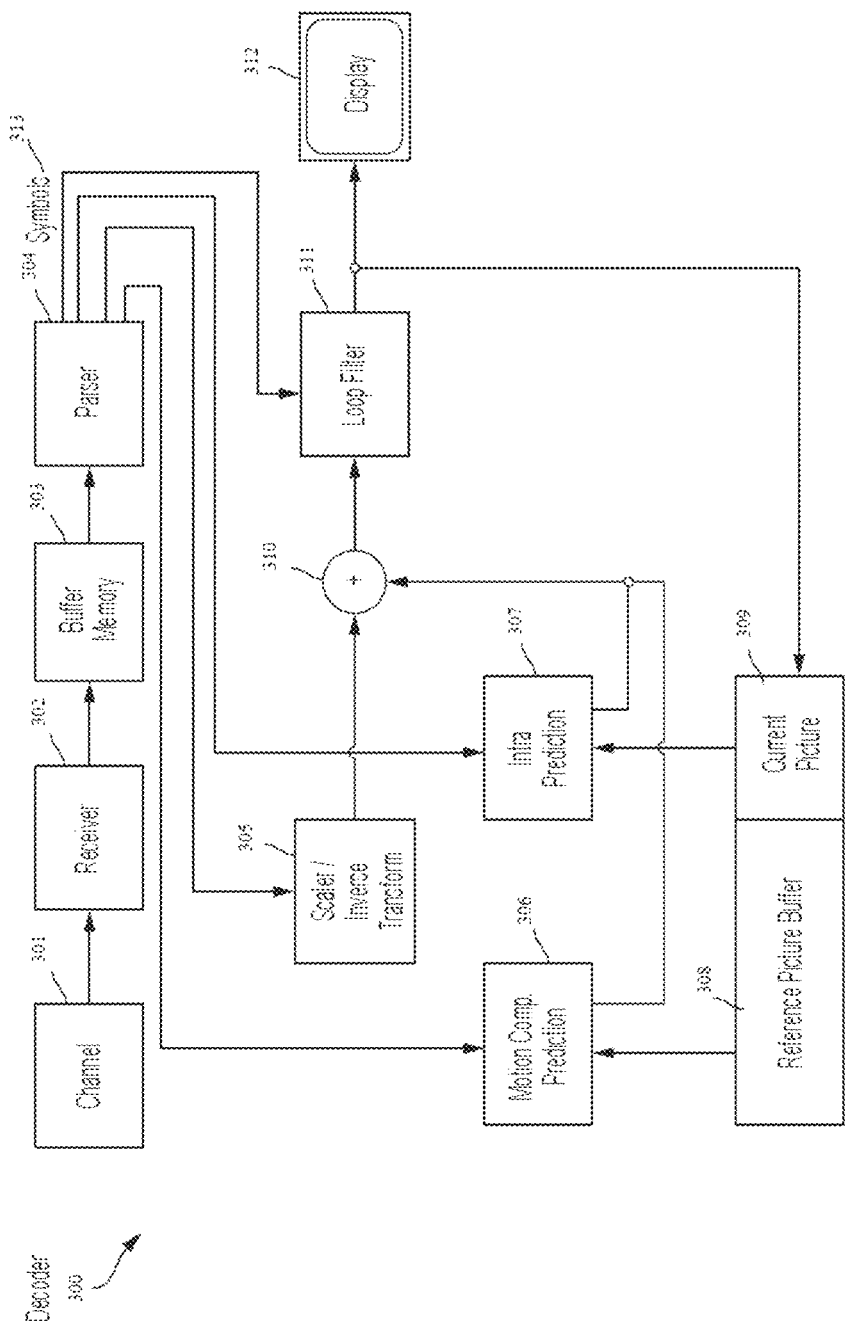
FIG. 3 is a schematic illustration of a diagram in accordance with embodiments.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information (VUI) parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
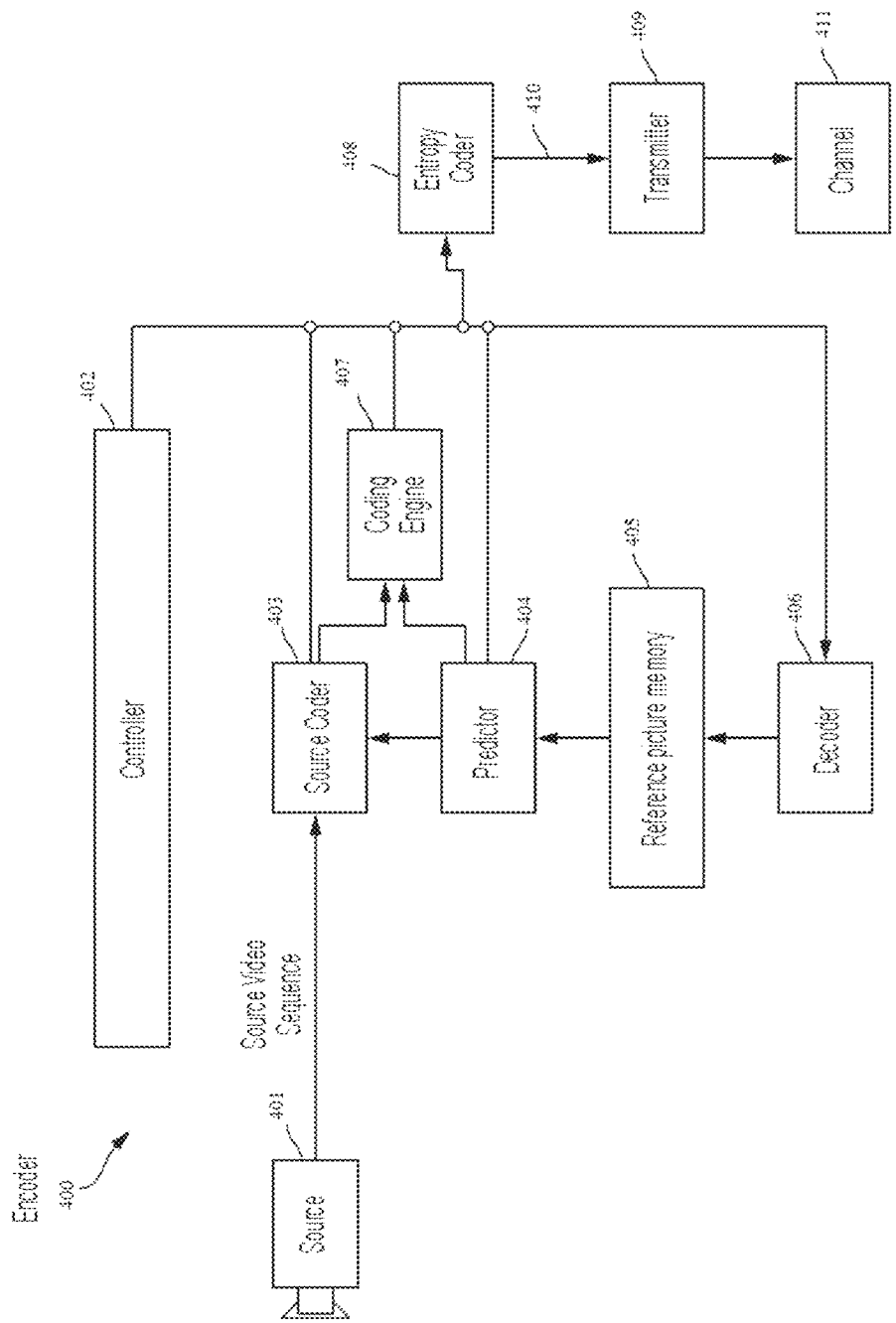
FIG. 4 is a schematic illustration of a diagram in accordance with embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any color space (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an over-simplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
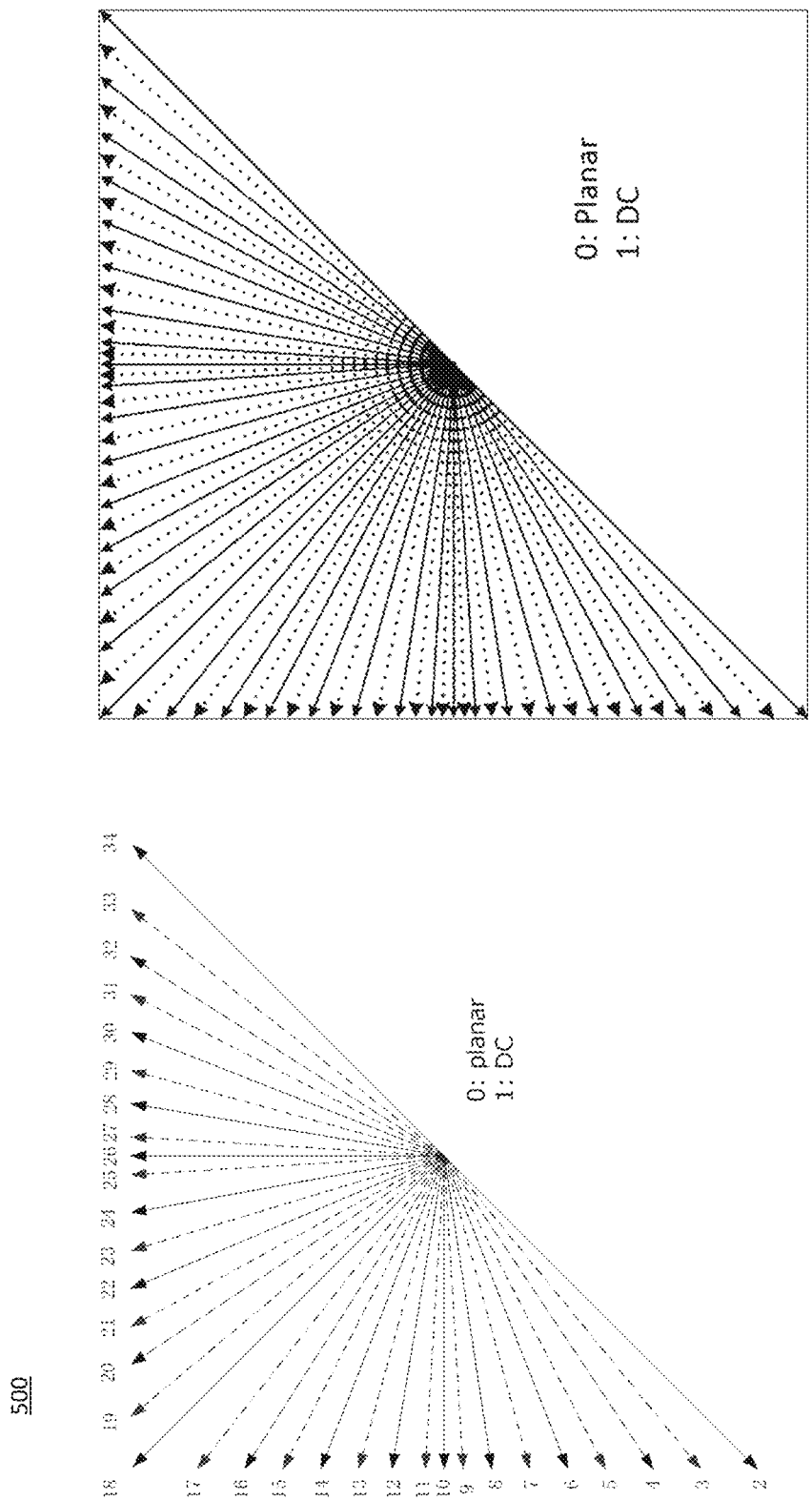
FIG. 5 is a schematic illustration of a diagram in accordance with embodiments.

FIG. 5 illustrates intra prediction modes used in High Efficiency Video Coding (HEVC) and Joint Exploration Model (JEM). To capture the arbitrary edge directions presented in natural video, the number of directional intra modes is extended from 33, as used in HEVC, to 65. The additional directional modes in JEM on top of HEVC are depicted as dotted arrows in FIG. 1 (*b*), and the planar and DC modes remain the same. These denser directional intra prediction modes apply for all block sizes and for both luma and chroma intra predictions. As shown in FIG. 5, the directional intra prediction modes as identified by dotted arrows, which is associated with an odd intra prediction mode index, are called odd intra prediction modes. The directional intra prediction modes as identified by solid arrows, which are associated with an even intra prediction mode index, are called even intra prediction modes. In this document, the directional intra prediction modes, as indicated by solid or dotted arrows in FIG. 5 are also referred as angular modes.

In JEM, a total of 67 intra prediction modes are used for luma intra prediction. To code an intra mode, an most probable mode (MPM) list of size 6 is built based on the intra modes of the neighboring blocks. If intra mode is not from the MPM list, a flag is signaled to indicate whether intra mode belongs to the selected modes. In JEM-3.0, there are 16 selected modes, which are chosen uniformly as every fourth angular mode. In JVET-D0114 and JVET-G0060, 16 secondary MPMs are derived to replace the uniformly selected modes.

Figure 6:
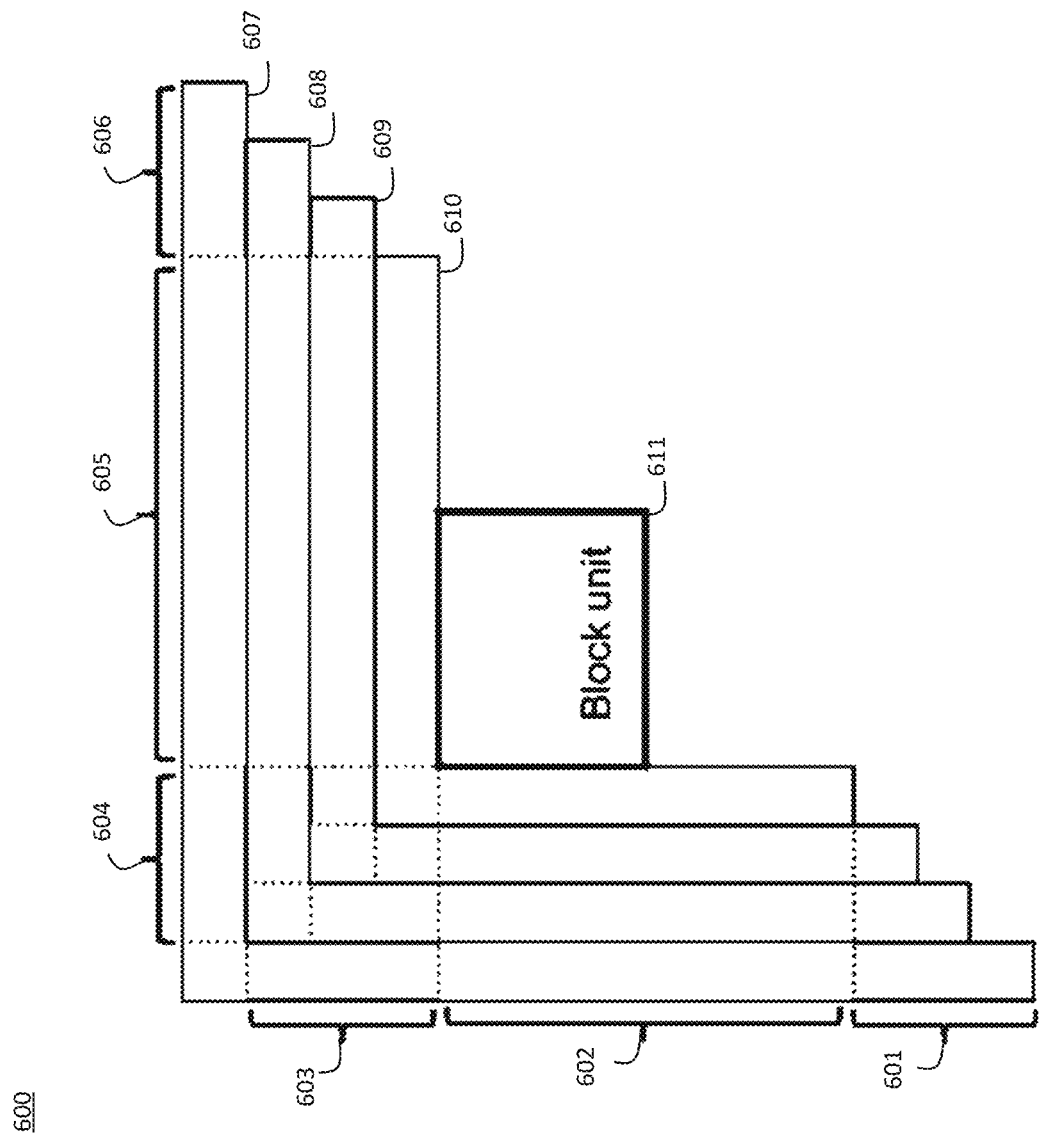
FIG. 6 is a schematic illustration of a diagram in accordance with embodiments.

FIG. 6 illustrates N reference tiers exploited for intra directional modes. There is a block unit 611, a segment A 601, a segment B 602, a segment C 603, a segment D 604, a segment E 605, a segment F 606, a first reference tier 610, a second reference tier 609, a third reference tier 608 and a fourth reference tier 607.

In both HEVC and JEM, as well as some other standards such as H.264/AVC, the reference samples used for predicting the current block are restricted to a nearest reference line (row or column). In the method of multiple reference line intra prediction, the number of candidate reference lines (row or columns) are increased from one (i.e. the nearest) to N for the intra directional modes, where N is an integer greater than or equal to one. FIG. 2 takes 4×4 prediction unit (PU) as an example to show the concept of the multiple line intra directional prediction method. An intra-directional mode could arbitrarily choose one of N reference tiers to generate the predictors. In other words, the predictor p(x,y) is generated from one of the reference samples S1, S2, . . . , and SN. A flag is signaled to indicate which reference tier is chosen for an intra-directional mode. If N is set as 1, the intra directional prediction method is the same as the traditional method in JEM 2.0. In FIG. 6, the reference lines 610, 609, 608 and 607 are composed of six segments 601, 602, 603, 604, 605 and 606 together with the top-left reference sample. In this document, a reference tier is also called a reference line. The coordinate of the top-left pixel within current block unit is (0,0) and the top left pixel in the 1st reference line is (−1,−1).

In JEM, for the luma component, the neighboring samples used for intra prediction sample generations are filtered before the generation process. The filtering is controlled by the given intra prediction mode and transform block size. If the intra prediction mode is DC or the transform block size is equal to 4×4, neighboring samples are not filtered. If the distance between the given intra prediction mode and vertical mode (or horizontal mode) is larger than predefined threshold, the filtering process is enabled. For neighboring sample filtering, [1, 2, 1] filter and bi-linear filters are used.

A position dependent intra prediction combination (PDPC) method is an intra prediction method which invokes a combination of the un-filtered boundary reference samples and HEVC style intra prediction with filtered boundary reference samples. Each prediction sample pred[x][y] located at (x,y) is calculated as follows:

$$\text{pred}[x][y]=(wL*R_{-1,y}+wT*R_{x,-1}+wTL*R_{-1,-1}+(64-wL-wT-wTL)*\text{pred}[x][y]+32)>>6 \quad \text{(Eq. 2)}$$

where $R_{x,-1}, R_{-1,y}$ represent the unfiltered reference samples located at top and left of current sample (x,y), respectively, and $R_{-1,-1}$ represents the unfiltered reference sample located at the top-left corner of the current block. The weightings are calculated as below, $$wT=32>>((y<<1)>>\text{shift}) \quad \text{(Eq. 3)}$$

$$wL=32>>((x<<1)>>\text{shift}) \quad \text{(Eq. 4)}$$

$$wTL=-(wL>>4)-(wT>>4) \quad \text{(Eq. 5)}$$

$$\text{shift}=(\log 2(\text{width})+\log 2(\text{height})+2)>>2 \quad \text{(Eq. 6)}$$

Figure 7:
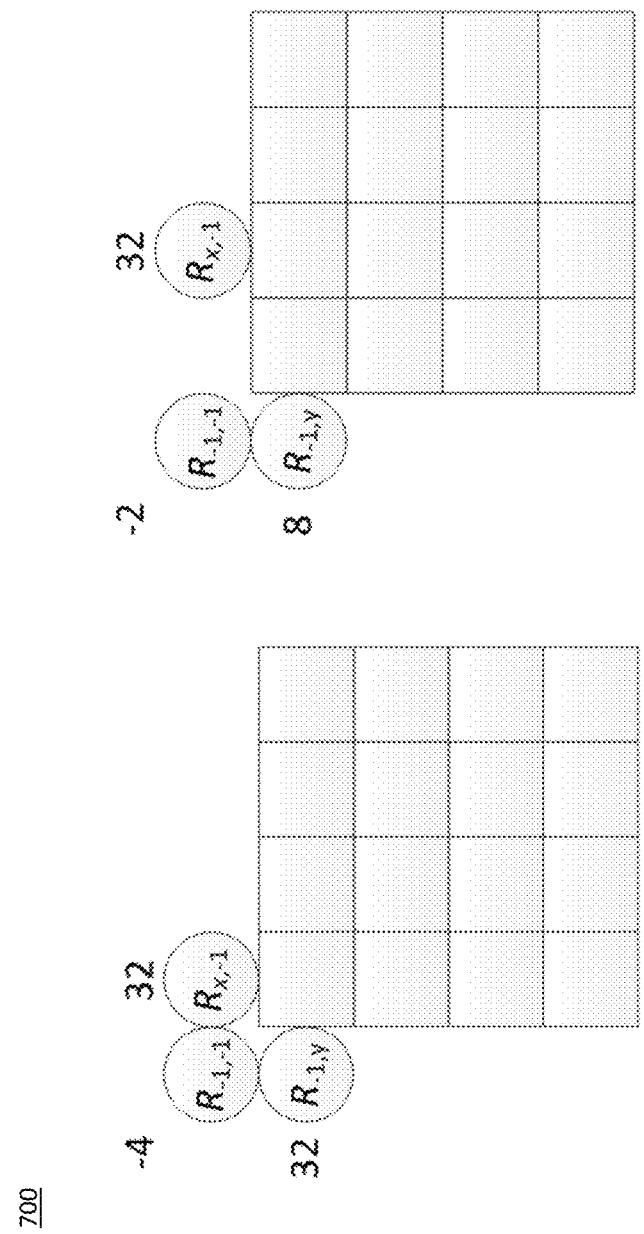
FIG. 7 is a schematic illustration of a diagram in accordance with embodiments.

FIG. 7 illustrates a diagram 700 in which DC mode PDPC weights (wL, wT, wTL) for (0, 0) and (1, 0) positions inside one 4×4 block. If PDPC is applied to DC, planar, horizontal, and vertical intra modes, additional boundary filters are not needed, such as the HEVC DC mode boundary filter or horizontal/vertical mode edge filters. FIG. 7 illustrates the definition of reference samples Rx,−1, R−1,y and R−1,−1 for PDPC applied to the top-right diagonal mode. The prediction sample pred(x', y') is located at (x', y') within the prediction block. The coordinate x of the reference sample Rx,−1 is given by: x=x'+y'+1, and the coordinate y of the reference sample R−1,y is similarly given by: y=x'+y'+1.

Figure 8:
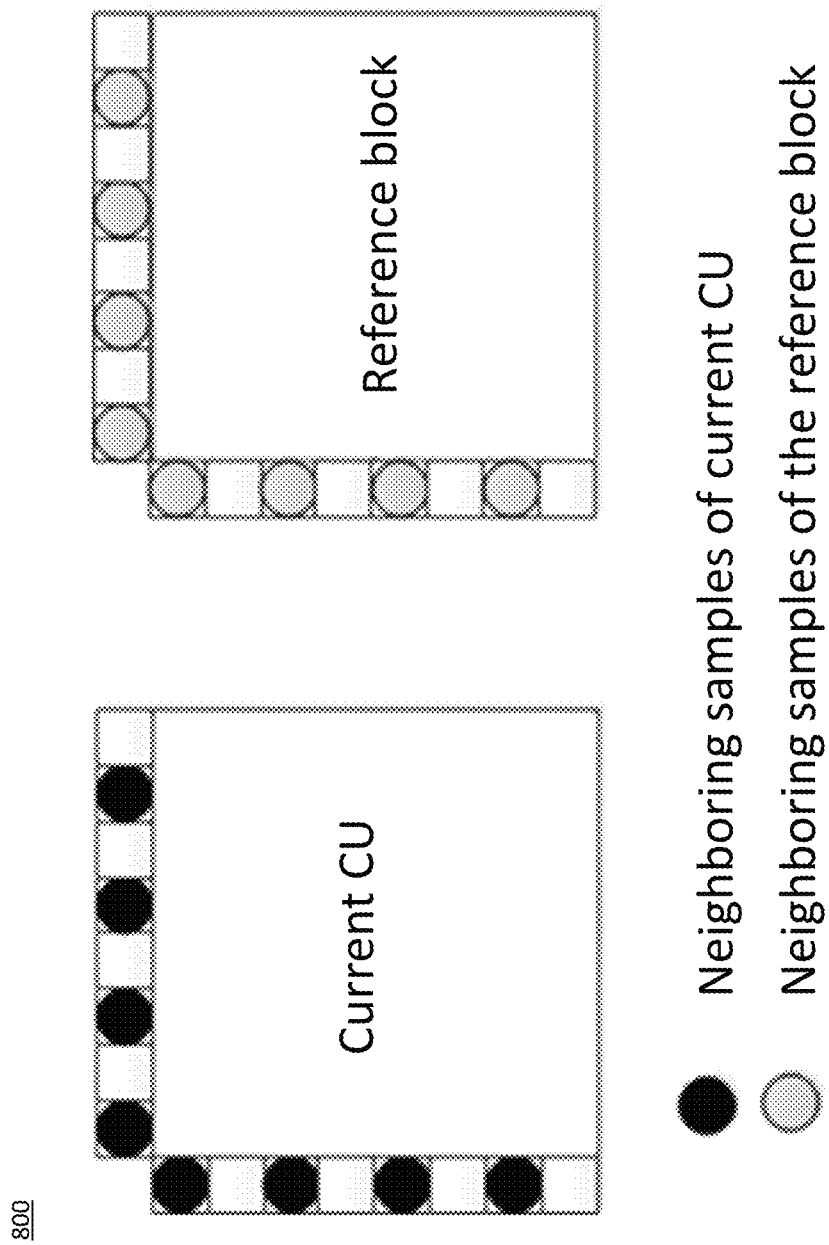
FIG. 8 is a schematic illustration of a diagram in accordance with embodiments.

FIG. 8 illustrates a Local Illumination Compensation (LIC) diagram 800 and is based on a linear model for illumination changes, using a scaling factor a and an offset b. And it is enabled or disabled adaptively for each inter-mode coded coding unit (CU).

When LIC applies for a CU, a least square error method is employed to derive the parameters a and b by using the neighboring samples of the current CU and their corresponding reference samples. More specifically, as illustrated in FIG. 8, the subsampled (2:1 subsampling) neighboring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

Figure 9B:
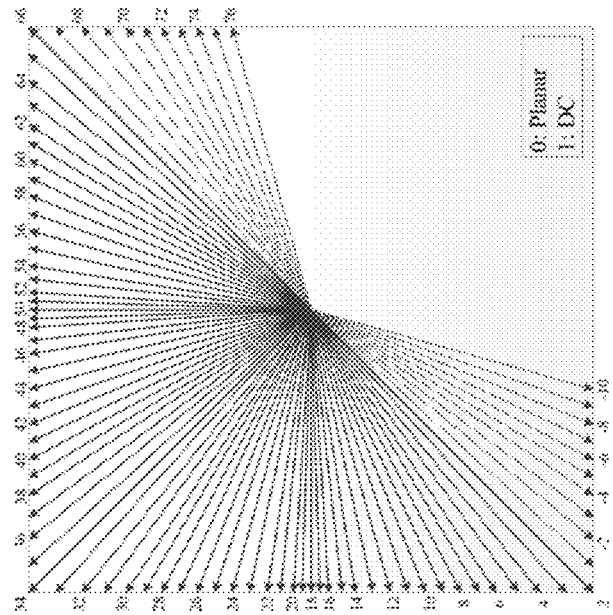
FIG. 9B is a schematic illustration of a diagram in accordance with embodiments.
Figure 9A:
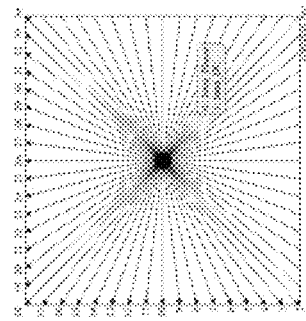
FIG. 9A is a schematic illustration of a diagram in accordance with embodiments.
Figure 10B:
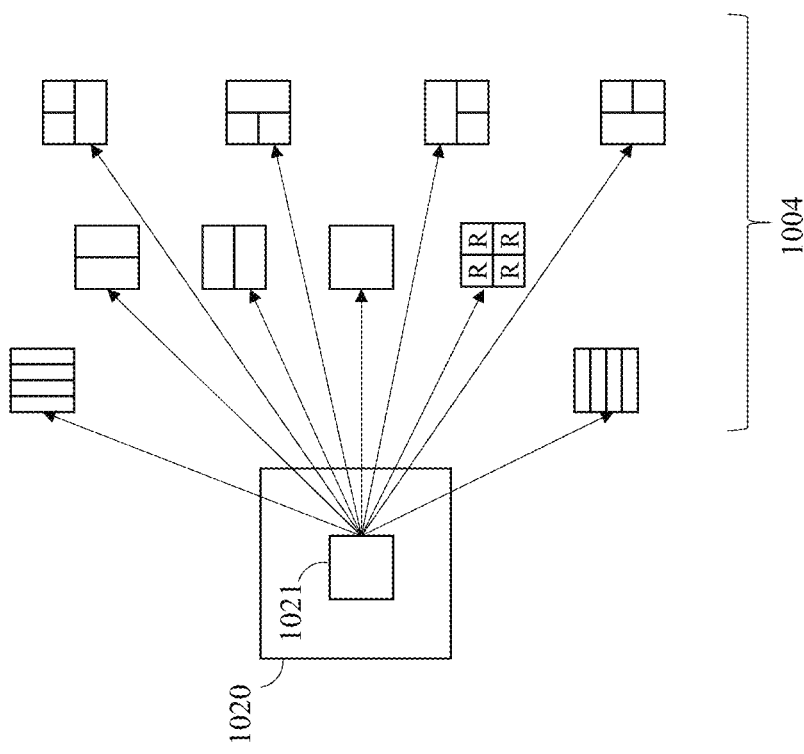
FIG. 10B is a schematic illustration of a diagrams in accordance with related art.
Figure 10A:
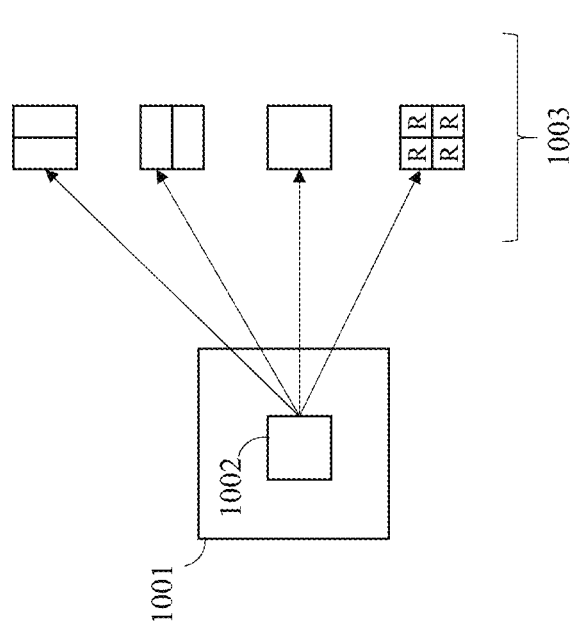
FIG. 10A is a schematic illustration of a diagrams in accordance with related art.
Figure 11A:
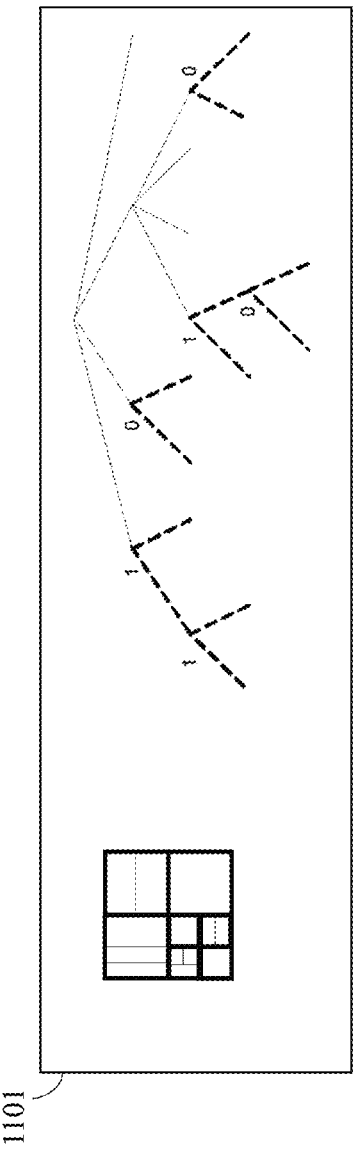
FIG. 11A is a schematic illustration of a diagrams in accordance with related art.
Figure 11B:
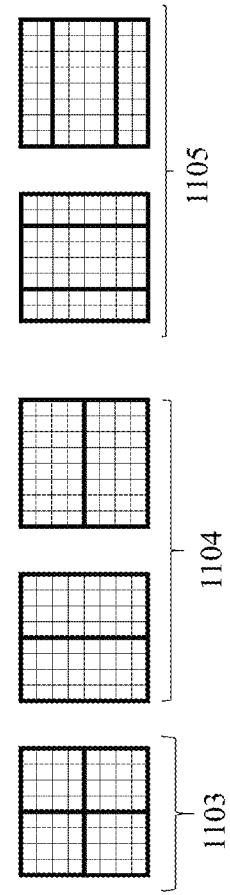
FIG. 11B is a schematic illustration of a diagrams in accordance with related art.

FIG. 9A illustrates intra prediction modes 900 used in HEVC. In HEVC, there are total 35 intra prediction modes, among which mode 10 is horizontal mode, mode 26 is vertical mode, and mode 2, mode 18 and mode 34 are diagonal modes. The intra prediction modes are signaled by three most probable modes (MPMs) and 32 remaining modes.

FIG. 9B illustrates, in embodiments of Versatile Video Coding (VVC), there are total 87 intra prediction modes where mode 18 is horizontal mode, mode 50 is vertical mode, and mode 2, mode 34 and mode 66 are diagonal modes. Modes −1~−10 and Modes 67~76 are called Wide-Angle Intra Prediction (WAIP) modes.

The prediction sample pred(x,y) located at position (x,y) is predicted using an intra prediction mode (DC, planar, angular) and a linear combination of reference samples according to the PDPC expression:

$$\text{pred}(x,y) = (wL \times R_{-1,y} + wT \times R_{x,-1} - wTL \times R_{-1,-1} + (64 - wL - wT + wTL) \times \text{pred}(x,y) + 32) >> 6 \quad \text{(Eq. 7)}$$

where $R_{x,-1}$, $R_{-1,y}$ represent the reference samples located at the top and left of current sample (x,y), respectively, and $R_{-1,-1}$ represents the reference sample located at the top-left corner of the current block.

For the DC mode the weights are calculated as follows for a block with dimensions width and height:

$$wT = 32 >> ((y << 1) >> n\text{Scale}), \, wL = 32 >> ((x << 1) >> n\text{Scale}), \, wTL = (wL >> 4) + (wT >> 4), \quad \text{(Eq. 8)}$$

with nScale=(log 2(width)−2+log 2(height)−2+2)>>2, where wT denotes the weighting factor for the reference sample located in the above reference line with the same horizontal coordinate, wL denotes the weighting factor for the reference sample located in the left reference line with the same vertical coordinate, and wTL denotes the weighting factor for the top-left reference sample of the current block, nScale specifies how fast weighting factors decrease along the axis (wL decreasing from left to right or wT decreasing from top to bottom), namely weighting factor decrement rate, and it is the same along x-axis (from left to right) and y-axis (from top to bottom) in current design. And 32 denotes the initial weighting factors for the neighboring samples, and the initial weighting factor is also the top (left or top-left) weightings assigned to top-left sample in current CB, and the weighting factors of neighboring samples in PDPC process should be equal to or less than this initial weighting factor.

For planar mode wTL=0, while for horizontal mode wTL=wT and for vertical mode wTL=wL. The PDPC weights can be calculated with adds and shifts only. The value of pred(x,y) can be computed in a single step using Eq. 1.

Figure 12:
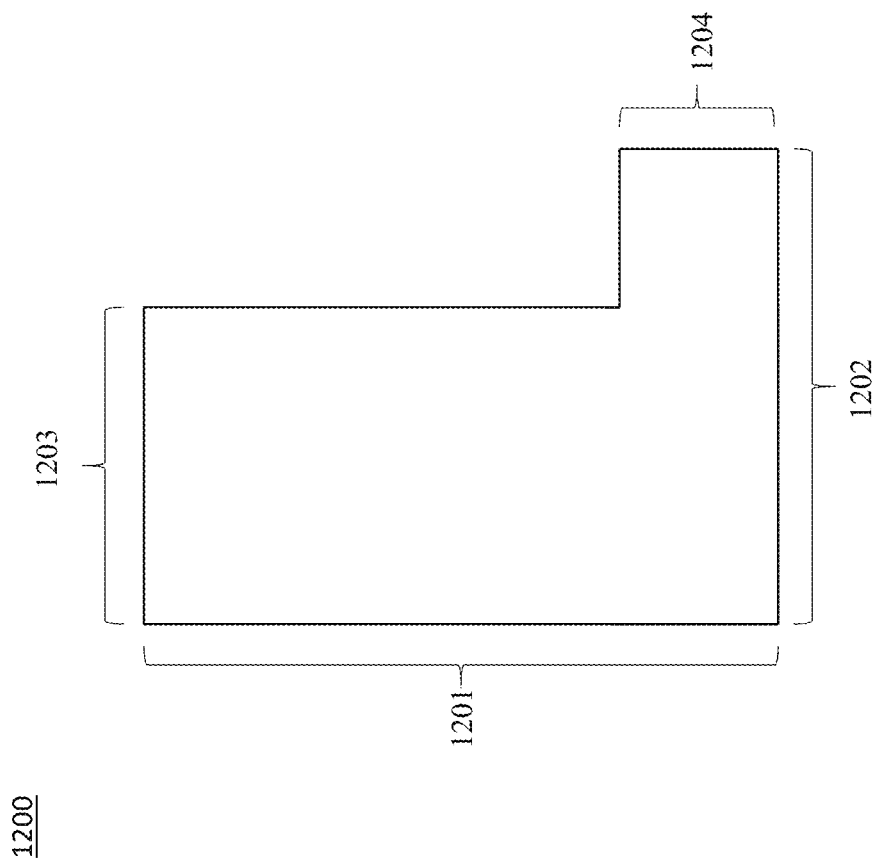
FIG. 12 is a schematic illustration in accordance with embodiments.

FIG. 12 illustrates a simplified block diagram 1200 of an L-type partition. As will be understood from the illustration of FIG. 12, an L-type partitioning can split a block into one or more L-shape partition and one or more rectangular partitions and/or one or more L-shaped partitions, and an L-shaped (or L-Type) partition is defined as the following shape, shown in FIG. 12 having a height 1201, a width 1202, a shorter width 1203, and a shorter height 1204, and a rotated L-shaped partition is also regarded as an L-shaped partition herein.

Several terms are associated with an L-shaped partition, including width, height, shorter width and shorter height, as indicated in the above discussion with respect to FIG. 12.

Figure 13A:
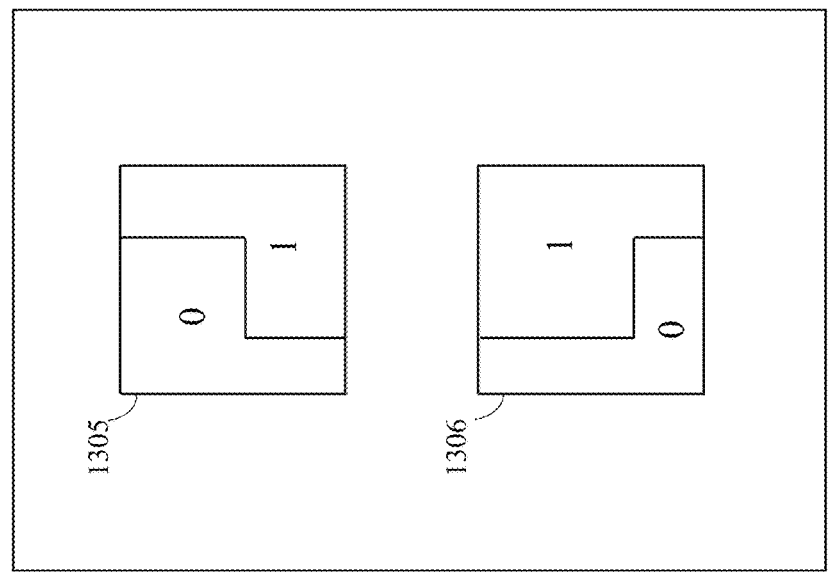
FIG. 13A is a schematic illustration in accordance with embodiments.

Examples of an L-type partitioning tree are described as follows with respect to the simplified block diagram 1300 of FIG. 13A, in which partition one block into two partitions, including one L-shape partition (partition 1) and one rectangular partition (0) in, for example, any of the arrangements 1301, 1302, 1303, and 1304 shown in FIG. 13A, according to exemplary embodiments.

Figure 13B:
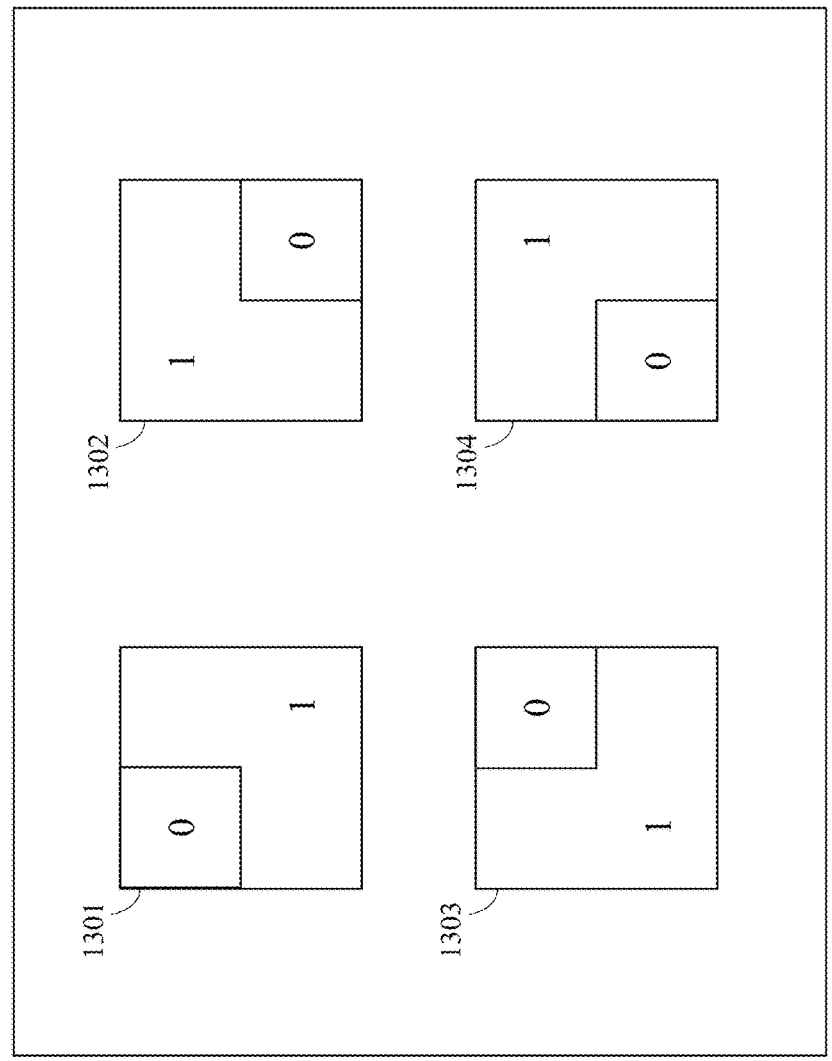
FIG. 13B is a schematic illustration in accordance with embodiments.
Figure 15:
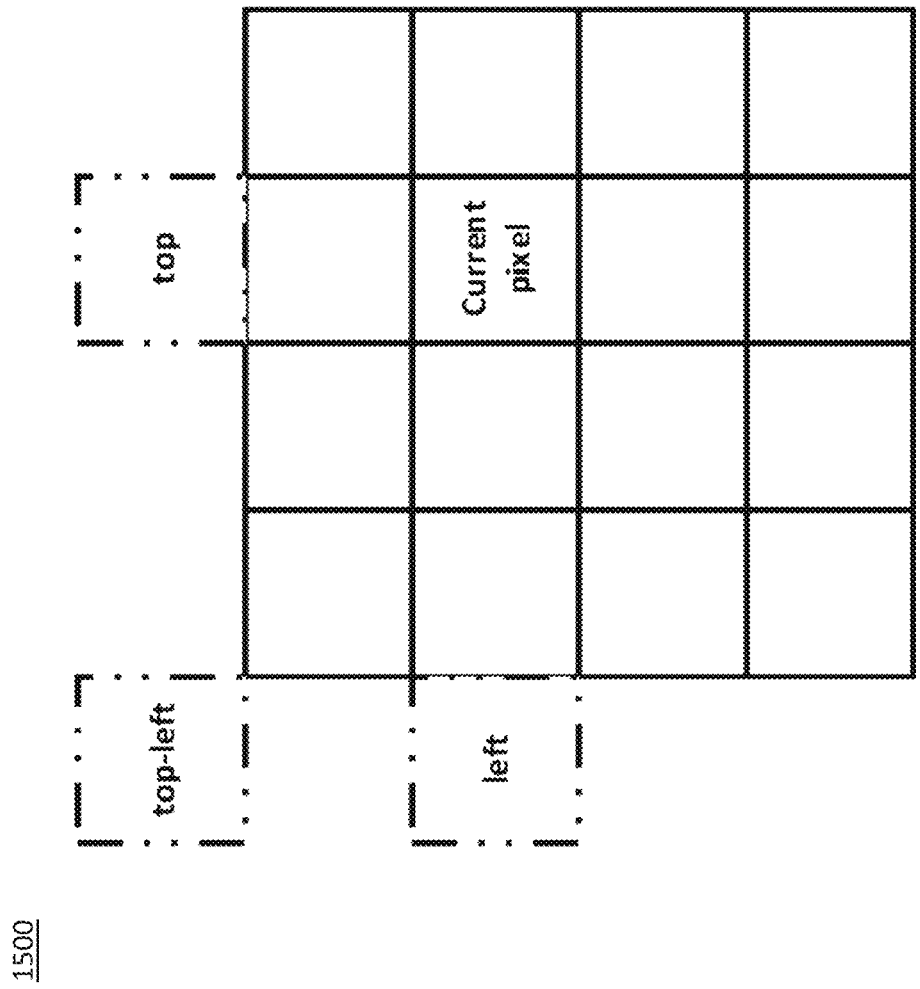
FIG. 15 is a schematic illustration of a diagram in accordance with related art.
Figure 17:
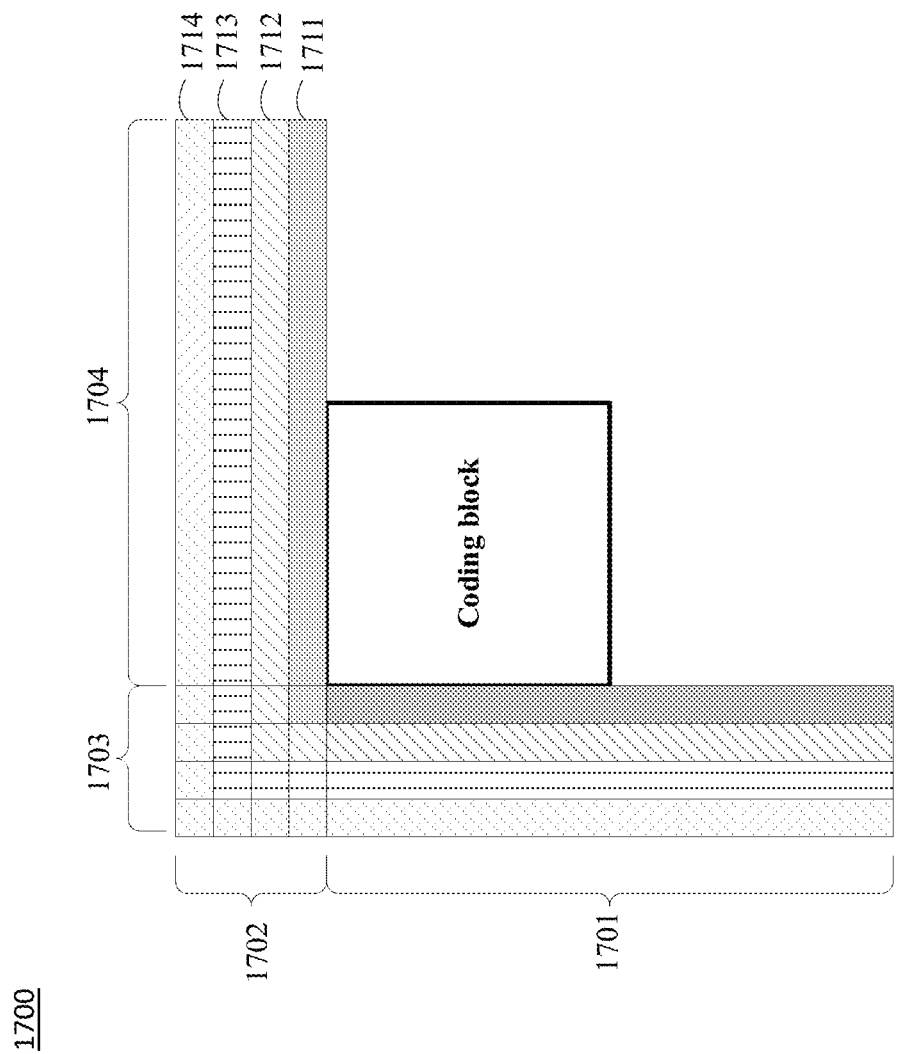
FIG. 17 is a schematic illustration of a diagram in accordance with related art.

Similarly, FIG. 13B shows a diagram 1300B that in which block 1305 and block 1306 can be split into an L-shaped partition (partition 1) and another L-shaped partition (partition 0).

Exemplary embodiment herein with respect to one or more L-shaped partitions may be used separately or combined in any order. In this document, an L-shaped (or L-Type) partition is defined as the shape illustrated in FIG. 13A and FIG. 13B, and a rotated L-shaped partition will also be understood as regarded as an L-shaped partition.

According to exemplary embodiments discussed below and illustrated with FIGS. 14-26 for example, when a block is partitioned into multiple L-shape partitions (LP) and rectangular partitions (RP), the reference samples used for performing intra prediction of the L-shape partitions comes from the neighboring reconstructed samples of another LP or RP, while the neighboring reconstructed samples form an group of consecutive samples that form a chain in arbitrary shape instead of one horizontal and one vertical straight line. It will be understood that such reference samples together are called a reference sample chain (RSC).

Figure 18:
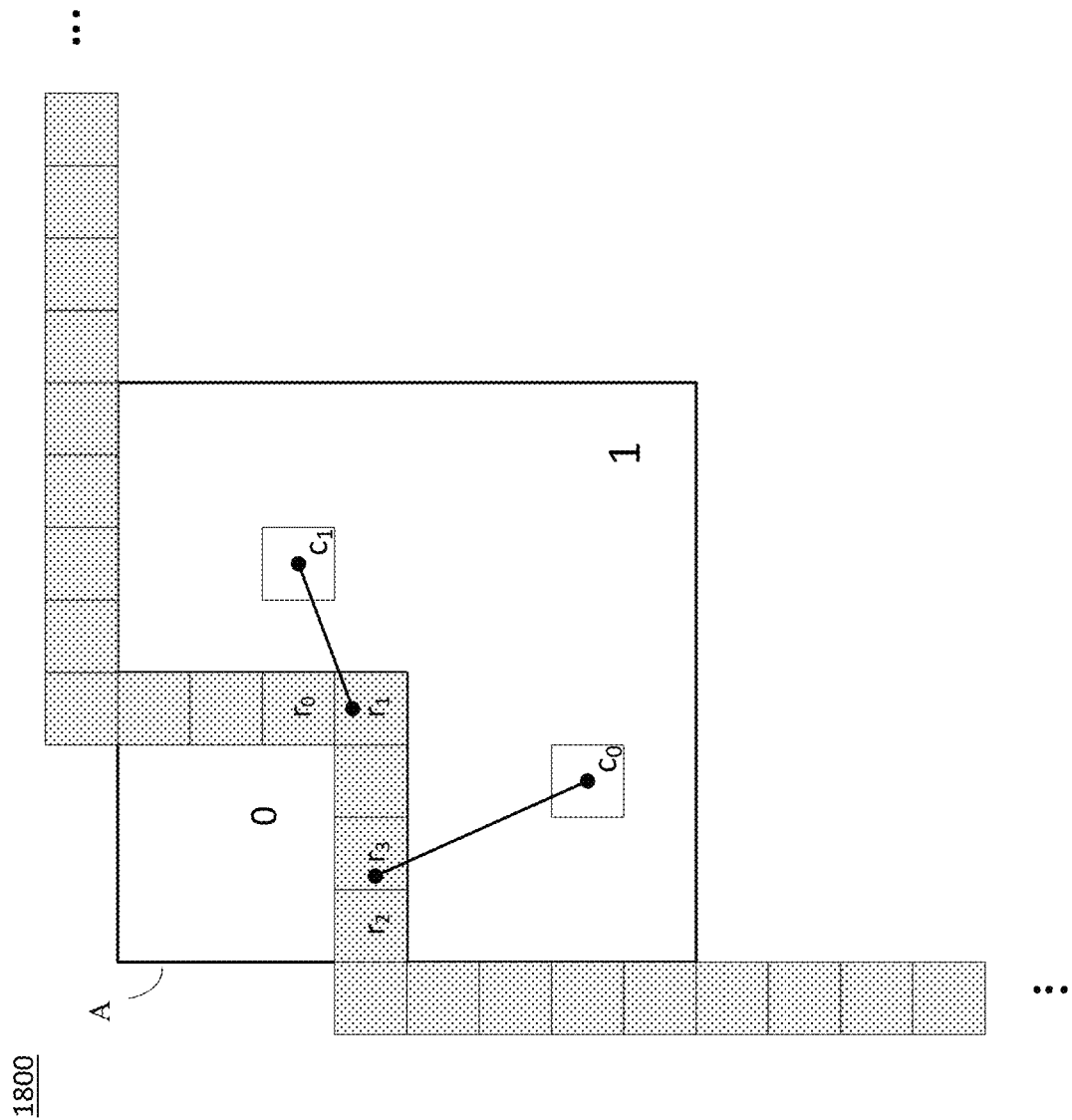
FIG. 18 is a schematic illustration of a diagram in accordance with embodiments.
Figure 19:
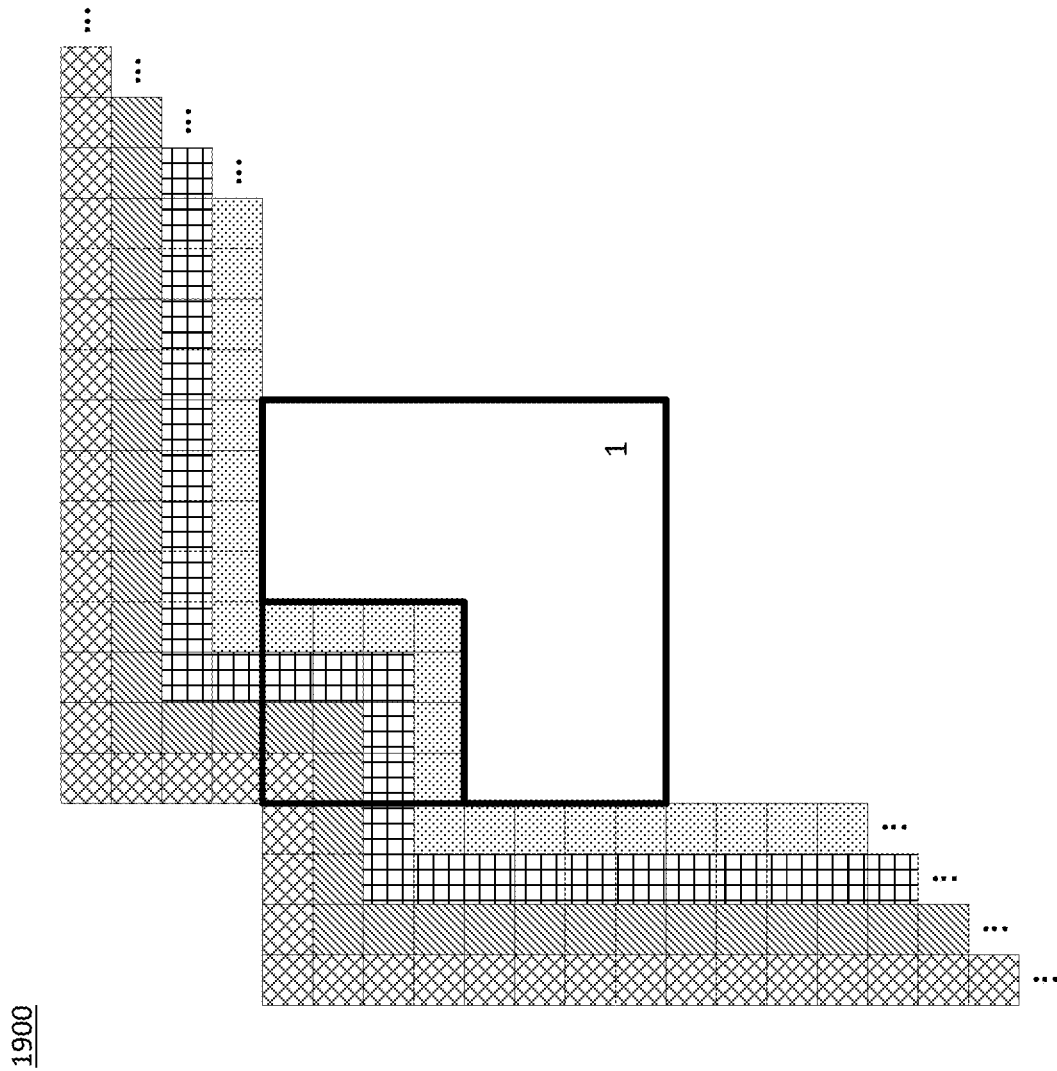
FIG. 19 is a schematic illustration in accordance with embodiments.

According to exemplary embodiments, such as with the simplified block diagram 1800 of FIG. 18, a block A is partitioned as two partitions, one LP (noted as "1") and one RP (noted as "0") as shown in FIG. 18. To perform intra prediction of partition 1, the samples in the reconstructed samples chain (indicated in shaded blocks in FIG. 18) are used as reference samples.

For example, in embodiments, when doing the directional (or angular) intra prediction for a sample (c0 and c1 in FIG. 18) in LP (partition 1), the sample coordinates are projected to the RSC. If a sample coordinate is projected to a vertical side of the RSC, samples along the vertical like directions (e.g., r0 and r1) are used to generate a prediction sample value. If a sample coordinate is projected to a horizontal side of the RSC, samples along the horizontal like directions (e.g., r2 and r3) are used to generate the prediction sample value.

Further, according to embodiments, when doing the MRLP, multiple RSCs are used instead of multiple reference lines, as shown in an example in the simplified diagram 1900 of FIG. 18 which is using four RSCs and samples within each RSC is marked with a same respective texture for ease of understanding at sides of the LP 1.

Figure 20:
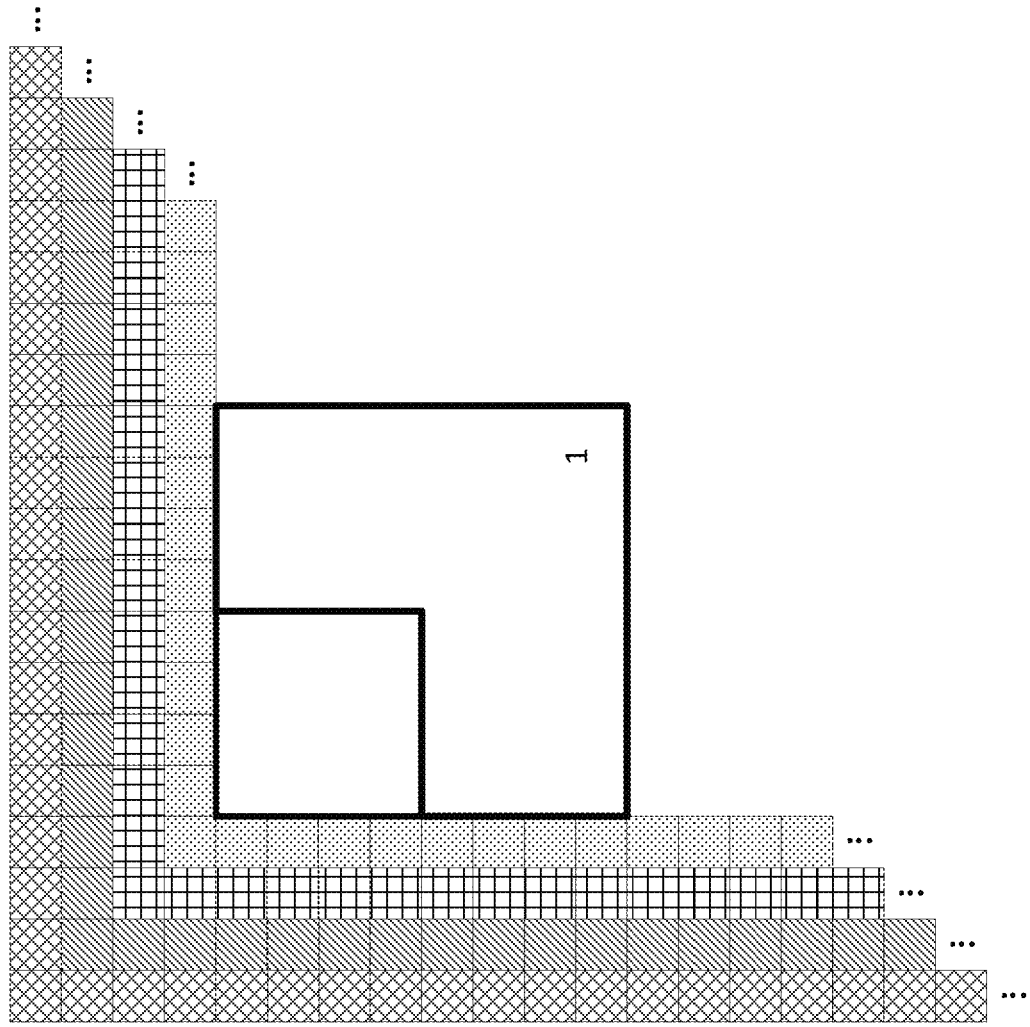
FIG. 20 is a schematic illustration in accordance with embodiments.

In embodiments, when doing the MRLP, non-adjacent reconstructed samples may be used and only top and left reconstructed samples that form straight lines can be used for intra prediction in MRLP, and for example, see the simplified diagram 2000 of FIG. 20 in which the top samples and left samples may include one or more samples that are not direct neighbor(s) of a current block. It will be understood from FIG. 20 that one or more of the textured samples are used for performing MRLP of the LP (partition 1).

Figure 21:
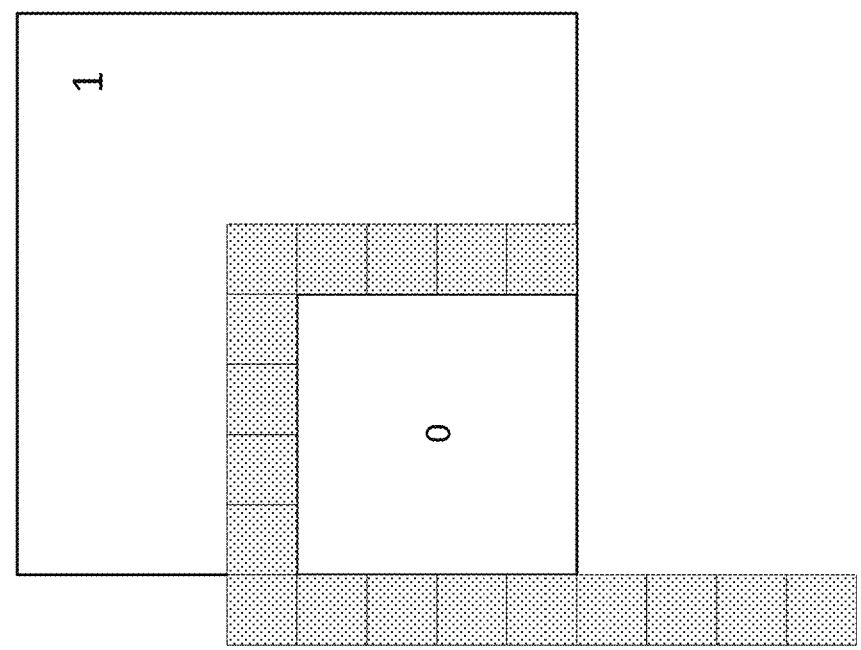
FIG. 21 is a schematic illustration in accordance with embodiments.

Further, for exemplary embodiments with respect to the simplified diagram 2100 of FIG. 21, In another embodiment, when the right or bottom side neighboring samples from a different partition (either LP or RP) are reconstructed prior to the reconstruction of samples in a current block, the right and bottom side neighboring samples may form an RSC and are used for performing intra prediction. An example is shown in the FIG. 21, where LP (partition 1) is reconstructed before RP (partition 0), and therefore the samples (as indicated by shaded blocks) form an RSC and may be used for intra prediction of RP (partition 0).

According to exemplary embodiments, when doing the Planar mode (defined in HEVC and VVC) or SMOOTH, SMOOTH-H, SMOOTH-V modes (defined in AV1), if the right or bottom samples are reconstructed, these reconstructed samples can be used directly in the 4-tap interpolation in Planar (or SMOOTH, SMOOTH-H, SMOOTH-V) mode instead of extrapolating the right and bottom samples by the top and left reconstructed samples, and when doing a DC mode, not only the above and left neighboring reconstructed samples, all the samples available in an RSC, which may include right and bottom reconstructed samples, can be used for generating the DC predictor.

Further, with the DC mode, not only the above and left neighboring reconstructed samples, all the samples except bottom-left and top-right available in the RSC, which may include right and bottom reconstructed samples, can be used for generating the DC predictor. When doing the boundary filtering (defined in HEVC) or PDPC (defined in VVC), not only the above and left neighboring reconstructed samples, all the samples available in the RSC which may include right and bottom reconstructed samples can be used to apply boundary filtering and PDPC predictions.

Figure 22:
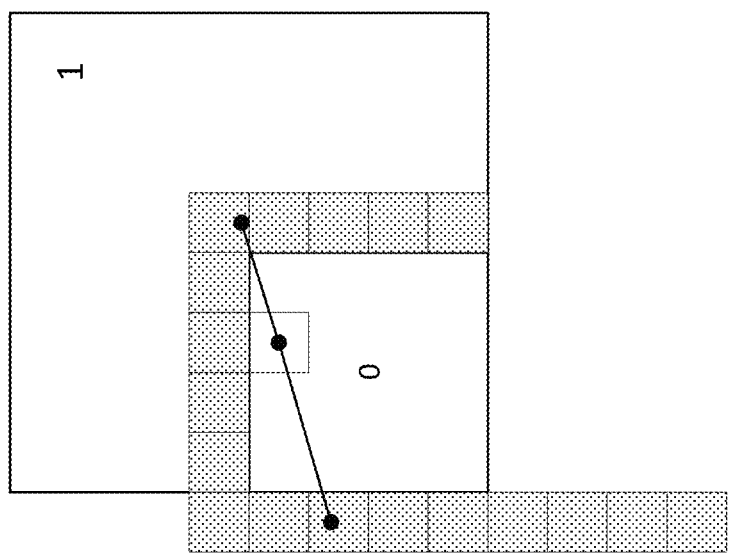
FIG. 22 is a schematic illustration in accordance with embodiments.

With respect to examples such as the diagram 2200 of FIG. 22, bi-directional intra prediction can be applied when reconstructed samples are available on both opposite sides as indicated by the lines drawn to the shaded areas from the partition 0 in FIG. 22.

Figure 23:
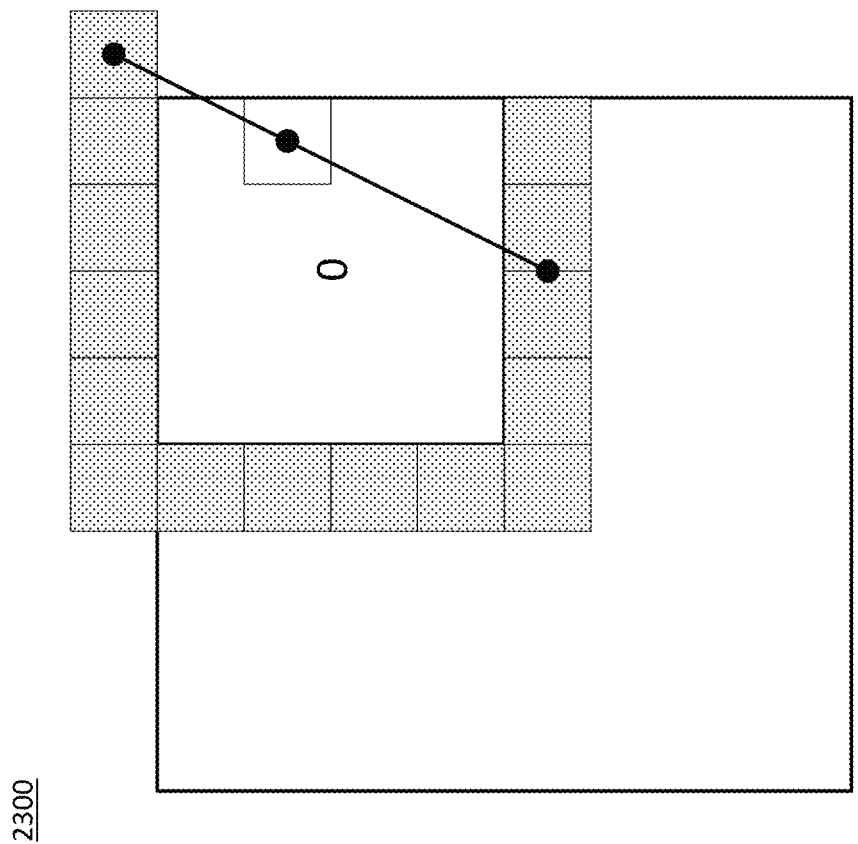
FIG. 23 is a schematic illustration in accordance with embodiments.

For example, when both left and right samples are reconstructed before the current block, the bi-directional prediction modes can be enabled which utilize a weighted sum of left and right samples along a horizontal-like prediction direction to generate the predictor as for example shown with respect to the diagram 2200 of FIG. 22. In one embodiment, when both left and right samples are reconstructed before the current block, the bi-directional prediction modes, which utilize weighted sum of left and right samples along a horizontal-like prediction direction to generate the predictor, are employed to replace the horizontal-like prediction. Thereby, in a bi-directional prediction mode, there may be generated a predictor for a current block in the rectangular shaped partition 0 of FIG. 22 by utilizing a weighted sum of first and second portions of the shaded reference sample chain where the first and second portions are respectively from the right and left of, and are non-neighboring sides to, the current block and the reference sample chain, as shown in FIG. 22, surrounds the current block at at least three sides: a left side, a top side, and a right side as understood from the orientations illustrated by the FIG. 22. As shown in FIGS. 22 and 23, the first portion of the reference sample chain is both to the right and to the top of the current block, and the second portion of the reference sample chain is both to the left and to the bottom of the current block as indicated by the respective arrows to the reference sample chains in those Figures.

Further, as shown with the diagram 2300 of FIG. 23, when both top and bottom samples are reconstructed before a current block, bi-directional prediction modes can be enabled which utilize a weighted sum of left and right samples along a vertical-like prediction direction to generate the predictor, and when both top and bottom samples are reconstructed before the current block, the bi-directional prediction modes, which utilize weighted sum of left and right samples along a vertical-like prediction direction to generate the predictor, is employed to replace the vertical-like prediction.

Figure 24:
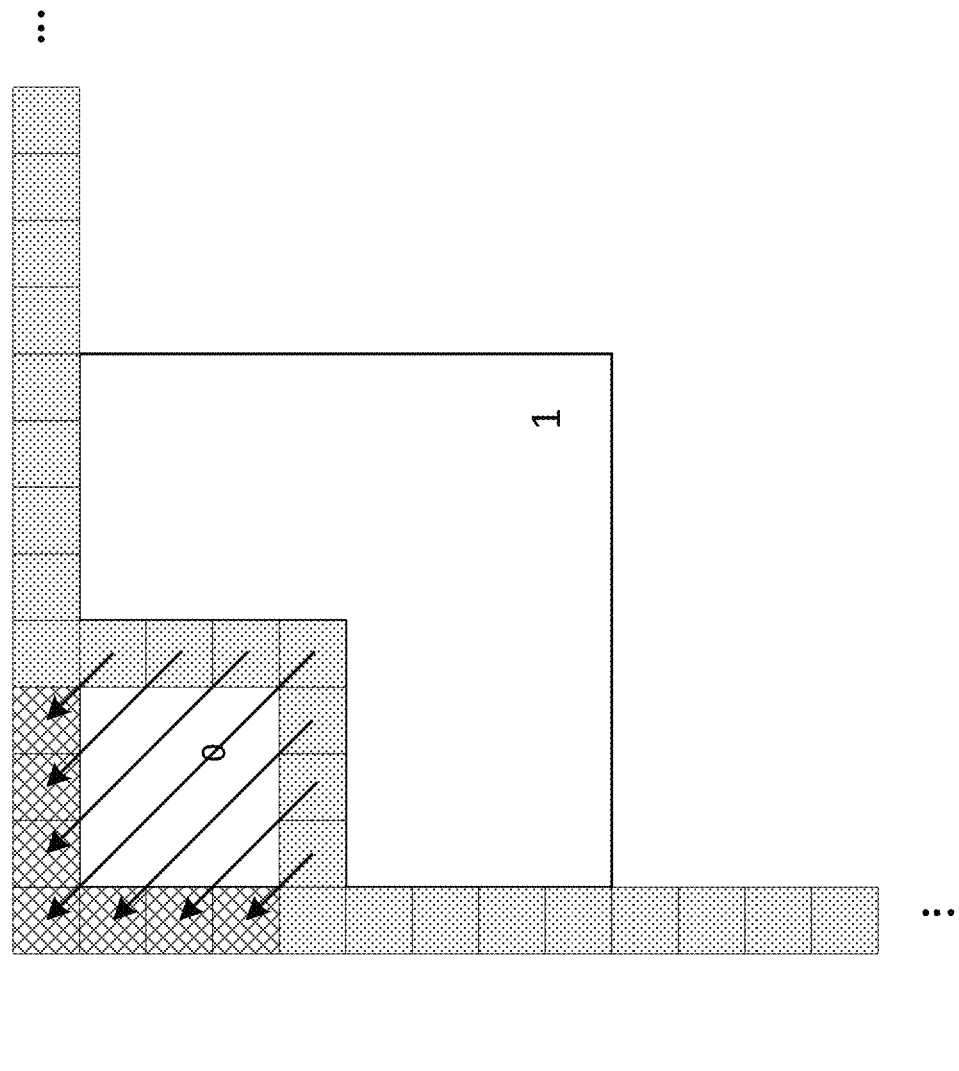
FIG. 24 is a schematic illustration in accordance with embodiments.

When a block is partitioned into several L-shape partitions (LP) and rectangular partitions (RP), if the neighboring reconstructed samples form an arbitrary chain (RSC) instead of one horizontal and one vertical straight line, the samples in the RSC are first mapped to a top row and left column, such that the reference samples in these top row and left column can be used for intra prediction of current block as illustrated by such mapping in the diagram 2400 of FIG. 24. According to exemplary embodiments, such mapping of samples from RSC to the top and left column is done along the intra prediction direction. Alternatively, such mapping of samples from RSC to the top and left column is done using a 2-tap bi-linear filter or a 4-tap cubic filter or the nearest integer sample. Further alternatively, all the samples in the RSC may mapped to a top row, an example is shown in the diagram 2500 of FIG. 25.

Figure 25:
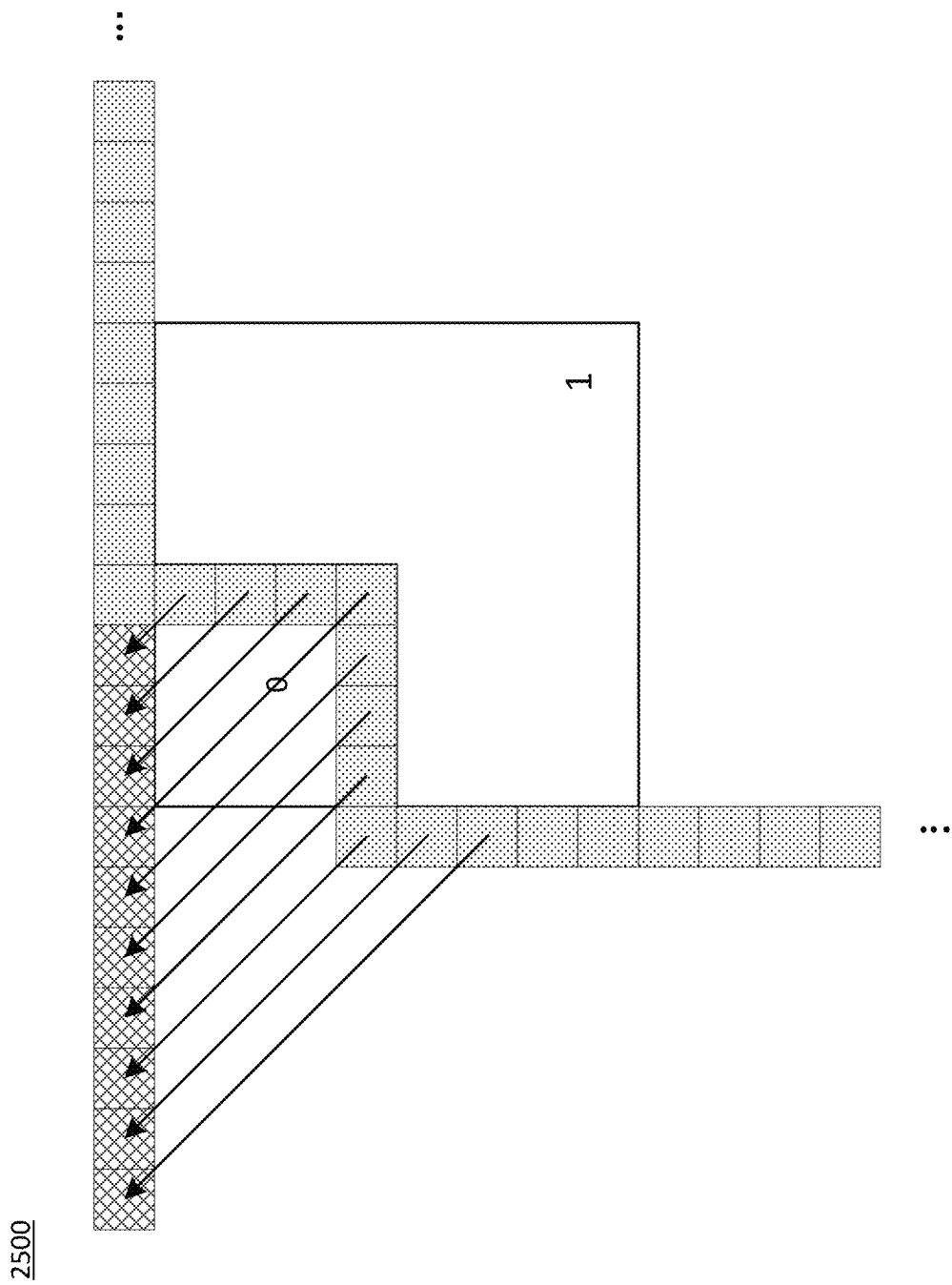
FIG. 25 is a schematic illustration in accordance with embodiments.

For example, with respect to FIG. 25, embodiments may map all samples in the RSC to the top row, as in FIG. 25, when it is determined that the intra prediction direction is vertical like, or when it is determined that the intra prediction direction is horizontal like Alternatives are also comprised by exemplary embodiments such as that all samples in the RSC may be mapped to a left column, or, for example, all samples in the RSC may be mapped to a left top column only when it is determined that the intra prediction direction is horizontal like. Similarly, an alternative embodiment also includes features that all samples in the RSC may be mapped to the left top column only when the intra prediction direction is determined to be vertical like.

In view of such embodiments, with L-type partitions, one or more neighboring reconstructed samples that may be also available from any of a right side and/or a bottom side, and even if the neighboring reference samples may no longer form a straight line, such samples may still be utilized.

Accordingly, by exemplary embodiments described herein, the technical problems noted above may be advantageously improved upon by one or more of these technical solutions.

The techniques described above, can be implemented as computer software using computer-readable instructions and physically stored in one or more computer-readable media or by a specifically configured one or more hardware processors. For example, FIG. 26 shows a computer system 2600 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 26:
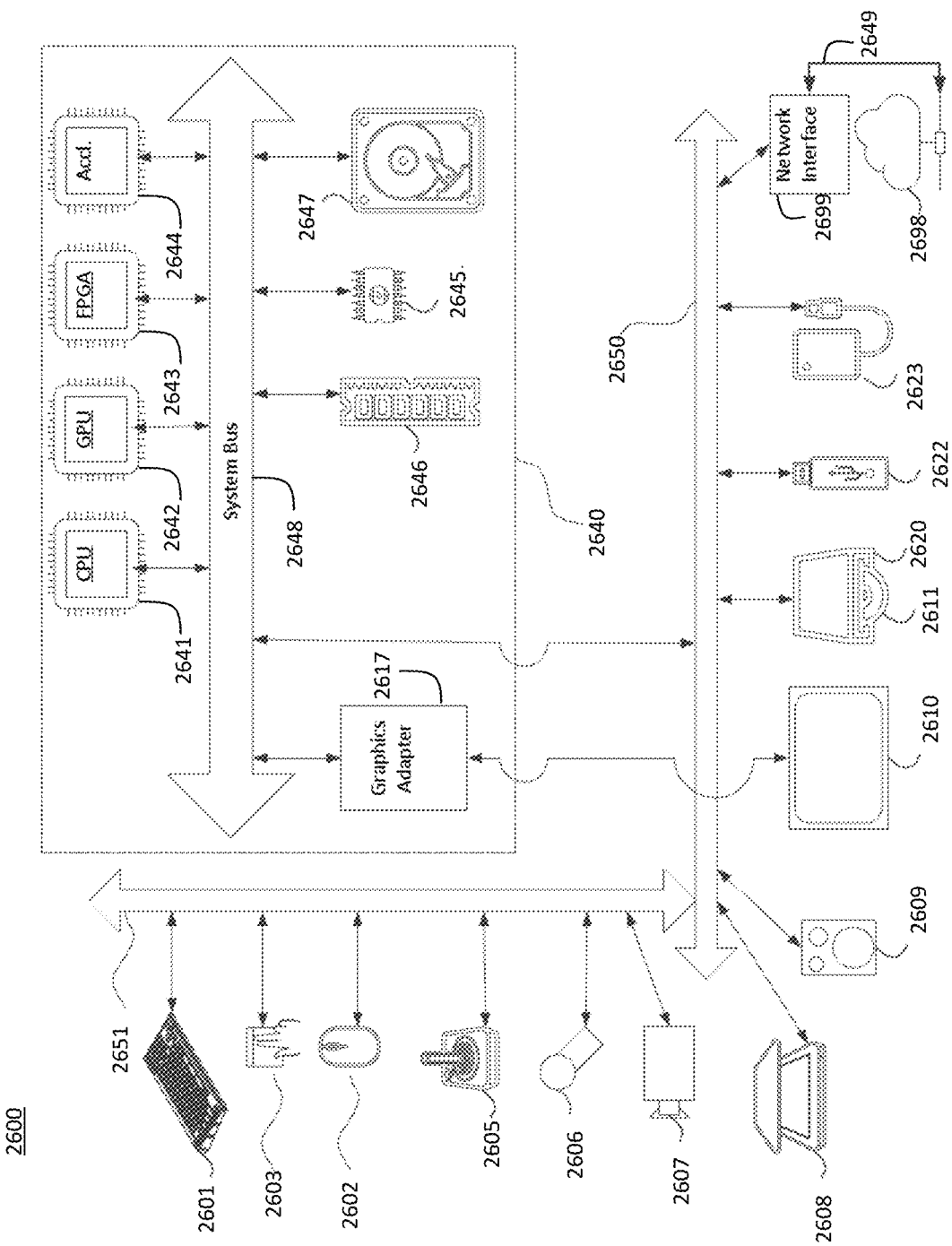
FIG. 26 is a schematic illustration in accordance with embodiments.

The components shown in FIG. 26 for computer system 2600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 2600.

Computer system 2600 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 2601, mouse 2602, trackpad 2603, touch screen 2610, joystick 2605, microphone 2606, scanner 2608, camera 2607.

Computer system 2600 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 2610, or joystick 2605, but there can also be tactile feedback devices that do not serve as input devices), audio output devices (such as: speakers 2609, headphones (not depicted)), visual output devices (such as screens 2610 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 2600 can also include human accessible storage devices and their associated media such as optical media including CD/DVD ROM/RW 2620 with CD/DVD 2611 or the like media, thumb-drive 2622, removable hard drive or solid state drive 2623, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 2600 can also include interface 2699 to one or more communication networks 2698. Networks 2698 can for example be wireless, wireline, optical. Networks 2698 can further be local, wide-area, metropolitan, vehicular and industrial, real-time, delay-tolerant, and so on. Examples of networks 2698 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 2698 commonly require external network interface adapters that attached to certain general-purpose data ports or peripheral buses (2650 and 2651) (such as, for example USB ports of the computer system 2600; others are commonly integrated into the core of the computer system 2600 by attachment to a system bus as described below (for example Ethernet interface into a PC computer system or cellular network interface into a smartphone computer system). Using any of these networks 2698, computer system 2600 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 2640 of the computer system 2600.

The core 2640 can include one or more Central Processing Units (CPU) 2641, Graphics Processing Units (GPU) 2642, a graphics adapter 2617, specialized programmable processing units in the form of Field Programmable Gate Areas (FPGA) 2643, hardware accelerators for certain tasks 2644, and so forth. These devices, along with Read-only memory (ROM) 2645, Random-access memory 2646, internal mass storage such as internal non-user accessible hard drives, SSDs, and the like 2647, may be connected through a system bus 2648. In some computer systems, the system bus 2648 can be accessible in the form of one or more physical plugs to enable extensions by additional CPUs, GPU, and the like. The peripheral devices can be attached either directly to the core's system bus 2648, or through a peripheral bus 2649. Architectures for a peripheral bus include PCI, USB, and the like.

CPUs 2641, GPUs 2642, FPGAs 2643, and accelerators 2644 can execute certain instructions that, in combination, can make up the aforementioned computer code. That computer code can be stored in ROM 2645 or RAM 2646. Transitional data can be also be stored in RAM 2646, whereas permanent data can be stored for example, in the internal mass storage 2647. Fast storage and retrieval to any of the memory devices can be enabled through the use of cache memory, that can be closely associated with one or more CPU 2641, GPU 2642, mass storage 2647, ROM 2645, RAM 2646, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 2600, and specifically the core 2640 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 2640 that are of non-transitory nature, such as core-internal mass storage 2647 or ROM 2645. The software implementing various embodiments of the present disclosure can be stored in such devices and executed by core 2640. A computer-readable medium can include one or more memory devices or chips, according to particular needs. The software can cause the core 2640 and specifically the processors therein (including CPU, GPU, FPGA, and the like) to execute particular processes or particular parts of particular processes described herein, including defining data structures stored in RAM 2646 and modifying such data structures according to the processes defined by the software. In addition or as an alternative, the computer system can provide functionality as a result of logic hardwired or otherwise embodied in a circuit (for example: accelerator 2644), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method performed by at least one processor, comprising:
   obtaining a block of video data;
   splitting the block into an L-shaped partition and a second partition, the second partition being one of a rectangular shaped partition and another L-shaped partition; and
   performing intra prediction of the L-shaped partition by using a reference sample chain, comprising a chain of neighboring reconstructed samples, as reference samples,
   wherein the chain comprises both a plurality of horizontal reference lines and a plurality of vertical reference lines from reconstructed samples neighboring the L-shaped partition, and
   wherein the horizontal reference lines and the vertical reference lines are at least partly neighboring the block.

2. The method of claim 1,
   wherein the one of the rectangular shaped partition and the another L-shaped partition is the another L-shaped partition.

3. The method of claim 1,
   wherein a first one of the plurality of vertical reference lines is directly connected to a first one of the plurality of horizontal reference lines,
   wherein the first one of the plurality of horizontal reference lines is directly connected to a second one of the plurality of vertical reference lines,
   wherein the second of the plurality of vertical reference lines is directly connected to a second one of the plurality of horizontal reference lines,
   wherein the first one of the plurality of horizontal references lines and the second one of the plurality of vertical reference lines are within the block, and
   wherein the first one of the plurality of vertical reference lines and the second one of the plurality of horizontal reference lines are outside of the block.

4. The method of claim 1, further comprising:
   mapping at least one sample of at least one of the horizontal reference lines to a left column along the block; and
   mapping at least one sample of at least one of the vertical reference lines to a top row along the block.

5. The method of claim 1, further comprising:
   mapping at least one sample of at least one of horizontal reference lines to a top row along the block; and
   mapping at least one sample of at least one of the vertical reference lines to the top row along the block.

6. The method of claim 1,
   wherein performing the intra prediction comprises projecting a sample of the L-shaped partition to at least one of a vertical side and a horizontal side of the reference sample chain.

7. The method of claim 1, further comprising:
   enabling a bi-directional prediction mode; and
   in the bi-directional prediction mode, generating a predictor for a current block of the second partition by utilizing a weighted sum of a first portion and a second portion of the reference sample chain,
   wherein the first portion and the second portion of the reference sample chain are non-neighboring to the current block, and
   wherein the first portion and the second portion of the reference sample chain are respectively to the right and to the left of the current block.

8. The method of claim 7,
   wherein the first portion of the reference sample chain is both to the right and to the top of the current block, and
   wherein the second portion of the reference sample chain is both to the left and to the bottom of the current block.

9. The method of claim 8,
   wherein a first one of the first portion and the second portion of the reference sample chain is within the block, and
   wherein a second one of the first portion and the second portion of the reference sample chain is outside the block.

10. The method of claim 1,
    wherein the L-shaped partition comprises a first side and a second side opposite to the first side,
    wherein the first side comprises a height greater than the second side,
    wherein the L-shaped partition further comprises a third side and a fourth side opposite to the third side, and
    wherein the third side comprises a width that is greater than the fourth side.

11. An apparatus comprising:
    at least one memory configured to store computer program code;
    at least one hardware processor configured to access the computer program code and operate as instructed by the computer program code, the computer program code including:
       obtaining code configured to cause the processor to obtain a block of video data;
       splitting code configured to cause the processor to split the block into an L-shaped partition and a second partition, the second partition being one of a rectangular shaped partition and another L-shaped partition; and
       performing code configured to cause the processor perform intra prediction of the L-shaped partition by using a reference sample chain, comprising a chain of neighboring reconstructed samples, as reference samples, wherein the chain comprises both a plurality of horizontal reference lines and a plurality of vertical reference lines from reconstructed samples neighboring the L-shaped partition, and wherein the horizontal reference lines and the vertical reference lines are at least partly neighboring the block.

12. The apparatus according to claim 11,
wherein the one of the rectangular shaped partition and the another L-shaped partition is the another L-shaped partition.

13. The apparatus according to claim 11,
wherein a first one of the plurality of vertical reference lines is directly connected to a first one of the plurality of horizontal reference lines,
wherein the first one of the plurality of horizontal reference lines is directly connected to a second one of the plurality of vertical reference lines,
wherein the second of the plurality of vertical reference lines is directly connected to a second one of the plurality of horizontal reference lines,
wherein the first one of the plurality of horizontal references lines and the second one of the plurality of vertical reference lines are within the block, and
wherein the first one of the plurality of vertical reference lines and the second one of the plurality of horizontal reference lines are outside of the block.

14. The apparatus according to claim 11, wherein the computer program code further includes:
mapping code configured to cause the processor to map at least one sample of at least one of the horizontal reference lines to a left column along the block,
wherein the mapping code is further configured to cause the processor to map at least one sample of at least one of the vertical reference lines to a top row along the block.

15. The apparatus according to claim 11, wherein the computer program code further includes:
mapping code configured to cause the processor to map at least one sample of at least one of horizontal reference lines to a top row along the block,
wherein the mapping code is further configured to cause the processor to map at least one sample of at least one of the vertical reference lines to the top row along the block.

16. The apparatus according to claim 11,
wherein the performing code is further configured to cause the processor perform intra prediction by projecting a sample of the L-shaped partition to at least one of a vertical side and a horizontal side of the reference sample chain.

17. The apparatus according to claim 11, wherein the computer program code further includes:
enabling code configured to enable a bi-directional prediction mode; and
generating code configured to, in the bi-direction prediction mode, generate a predictor for a current block of the second shaped partition by utilizing a weighted sum of a first portion and a second portion of the reference sample chain,
wherein the first portion and the second portion of the reference sample chain are non-neighboring to the current block, and
wherein the first portion and the second portion of the reference sample chain are respectively to the right and to the left of the current block.

18. The apparatus according to claim 17,
wherein the first portion of the reference sample chain is both to the right and to the top of the current block, and
wherein the second portion of the reference sample chain is both to the left and to the bottom of the current block.

19. The apparatus according to claim 18,
wherein a first one of the first portion and the second portion of the reference sample chain is within the block, and
wherein a second one of the first portion and the second portion of the reference sample chain is outside the block.

20. A non-transitory computer readable medium storing a program causing a computer to execute a process, the process comprising:
obtaining a block of video data;
splitting the block into an L-shaped partition and a second partition, the second partition being one of a rectangular shaped partition and another L-shaped partition; and
performing intra prediction of the L-shaped partition by using a reference sample chain, comprising a chain of neighboring reconstructed samples, as reference samples,
wherein the one of the rectangular shaped partition and the another L-shaped partition is the another L-shaped partition, and
wherein the horizontal reference lines and the vertical reference lines are at least partly neighboring the block.

* * * * *